(12) United States Patent
Kikuchi

(10) Patent No.: US 12,444,131 B2
(45) Date of Patent: Oct. 14, 2025

(54) INFORMATION PROCESSING APPARATUS, INFORMATION PROCESSING SYSTEM, AND INFORMATION PROCESSING METHOD

(71) Applicant: Hidetoshi Kikuchi, Tokyo (JP)

(72) Inventor: Hidetoshi Kikuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 170 days.

(21) Appl. No.: 18/158,654

(22) Filed: Jan. 24, 2023

(65) Prior Publication Data

US 2023/0274500 A1  Aug. 31, 2023

(30) Foreign Application Priority Data

Feb. 28, 2022 (JP) .................................. 2022-030029

(51) Int. Cl.
*G06T 17/00* (2006.01)
*G06F 3/0482* (2013.01)

(52) U.S. Cl.
CPC ............ *G06T 17/00* (2013.01); *G06F 3/0482* (2013.01)

(58) Field of Classification Search
CPC .... G06F 3/0482; G06F 3/04815; G06T 17/00
See application file for complete search history.

(56) References Cited

U.S. PATENT DOCUMENTS

| | | | | |
|---|---|---|---|---|
| 5,880,731 A * | 3/1999 | Liles | ..................... | G06F 3/0481 345/473 |
| 5,926,179 A * | 7/1999 | Matsuda | ............... | G06F 3/0481 715/236 |
| 9,987,563 B2 * | 6/2018 | Jones | ..................... | H04L 51/04 |
| 2009/0259648 A1 * | 10/2009 | Bokor | ..................... | G06F 3/011 707/999.005 |
| 2011/0231433 A1 | 9/2011 | Tabata et al. | | |
| 2011/0231434 A1 | 9/2011 | Tabata et al. | | |
| 2016/0156771 A1 * | 6/2016 | Lee | ........................ | H04M 1/724 455/414.1 |
| 2016/0195923 A1 * | 7/2016 | Nauseef | ................... | A47C 7/72 297/344.21 |
| 2018/0329486 A1 * | 11/2018 | Williams | .............. | G02B 27/017 |
| 2020/0153713 A1 * | 5/2020 | Sugiyama | .............. | G06Q 50/00 |
| 2021/0232632 A1 * | 7/2021 | Howard | ................... | G06N 3/08 |
| 2022/0086203 A1 * | 3/2022 | Morris | .................... | H04N 7/157 |

FOREIGN PATENT DOCUMENTS

| | | |
|---|---|---|
| JP | 2000-057374 | 2/2000 |
| JP | 2009-048302 | 3/2009 |
| JP | 2011-216073 | 10/2011 |
| JP | 2011-217352 | 10/2011 |

OTHER PUBLICATIONS

Office Action dated Jan. 16, 2024 issued with respect to the corresponding Japanese Patent Application No. 2022-030029.

* cited by examiner

*Primary Examiner* — Phi Hoang
(74) *Attorney, Agent, or Firm* — IPUSA, PLLC

(57) ABSTRACT

An information processing apparatus includes circuitry that invokes and causes a proxy avatar to participate in a virtual space. The proxy avatar represents a first user, and is proxy for a user avatar that participates in the virtual space. In response to receipt from a second user of a request to the proxy avatar, the circuitry executes a process based on the request based on information of a process to be performed by the proxy avatar. The information of the process is set in accordance with attribute information of the second user.

13 Claims, 31 Drawing Sheets

FIG. 4A

| USER | ACCOUNT | |
|---|---|---|
| UserA | hogeA@companyX.co.jp | ⋮ |
| UserB | hogeB@companyX.co.jp | ⋮ |
| UserC | hogeC@companyX.co.jp | ⋮ |
| ⋮ | ⋮ | ⋮ |
| UserS | hogeS@companyY.co.jp | ⋮ |
| ⋮ | ⋮ | ⋮ |

FIG. 4B

| USER | ACCOUNT | DEPARTMENT | POSITION | |
|---|---|---|---|---|
| UserA | hogeA@companyX.co.jp | AAA OPERATIONS DEPARTMENT | SECTION CHIEF | ⋮ |
| UserB | hogeB@companyX.co.jp | AAA OPERATIONS DEPARTMENT | SECTION MANAGER | ⋮ |
| UserC | hogeC@companyX.co.jp | BBB DEVELOPMENT DEPARTMENT | SUPERVISOR | ⋮ |
| ⋮ | ⋮ | ⋮ | ⋮ | ⋮ |
| UserS | hogeS@companyY.co.jp | SALES DEPARTMENT | MANAGER | ⋮ |
| ⋮ | ⋮ | ⋮ | ⋮ | ⋮ |

FIG. 5

| USER | VIRTUAL SPACE TO CONNECT TO | IMAGE DATA |
|---|---|---|
| UserA | VIRTUAL SPACE VA | VIRTUAL SPACE DATA DA |
| UserB | VIRTUAL SPACE VA | VIRTUAL SPACE DATA DA |
| UserC | VIRTUAL SPACE VA | VIRTUAL SPACE DATA DA |
| ⋮ | ⋮ | ⋮ |
| UserS | VIRTUAL SPACE VB | VIRTUAL SPACE DATA DB |
| ⋮ | ⋮ | ⋮ |

FIG. 6

| USER | USER AVATAR ID | USER AVATAR IMAGE | PROXY AVATAR ID | PROXY AVATAR IMAGE | SCENARIO ID |
|---|---|---|---|---|---|
| UserA | Av001 | AVATAR IMAGE DATA Av1 | Ag001 | AVATAR IMAGE DATA Ag1 | Sn001 |
| UserB | Av002 | AVATAR IMAGE DATA Av2 | Ag002 | AVATAR IMAGE DATA Ag2 | Sn002 |
| UserC | Av003 | AVATAR IMAGE DATA Av3 | Ag003 | AVATAR IMAGE DATA Ag3 | Sn003 |
| ⋮ | ⋮ | ⋮ | ⋮ | ⋮ | ⋮ |
| UserS | Av050 | AVATAR IMAGE DATA Av50 | Ag050 | AVATAR IMAGE DATA Ag50 | Sn050 |
| ⋮ | ⋮ | ⋮ | ⋮ | ⋮ | ⋮ |

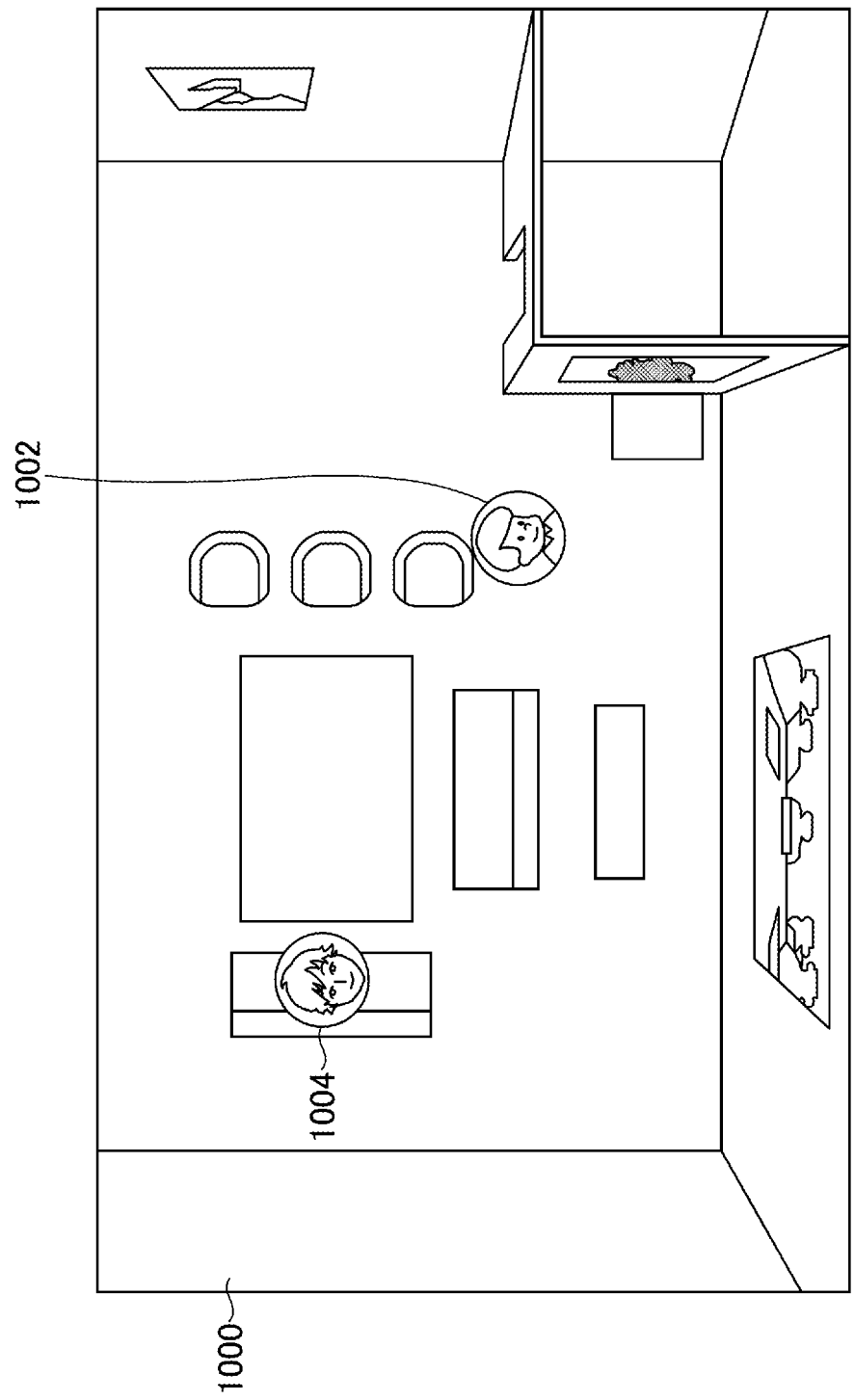

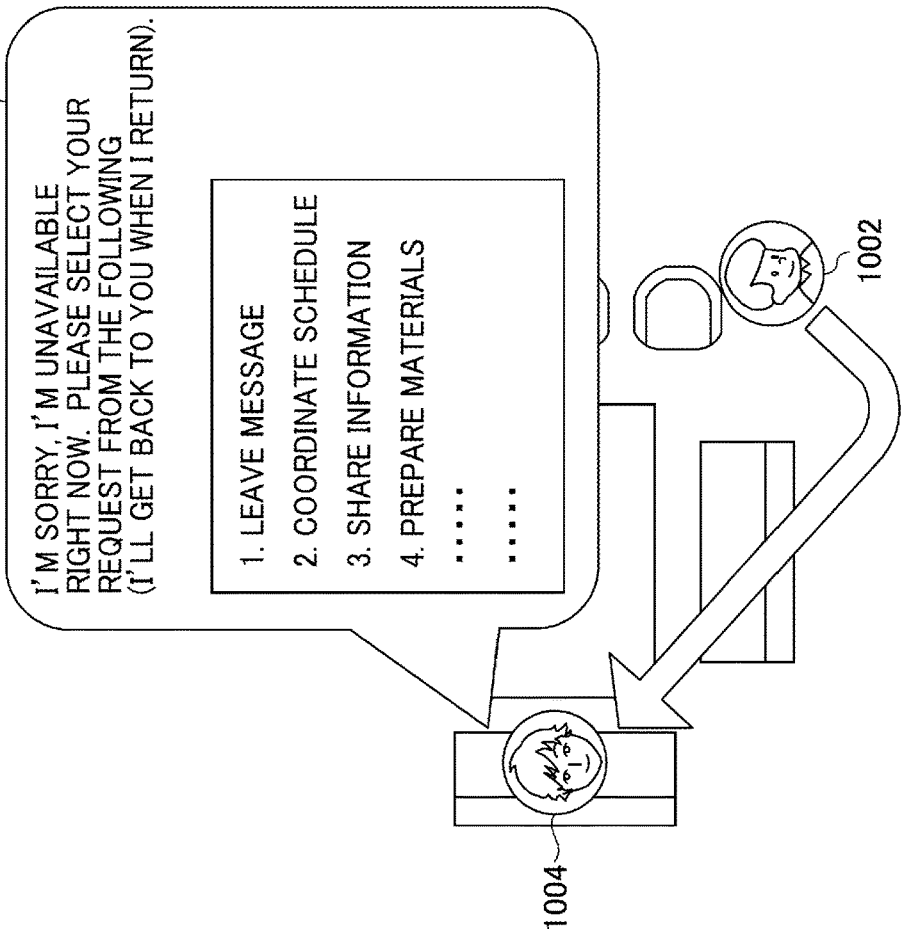
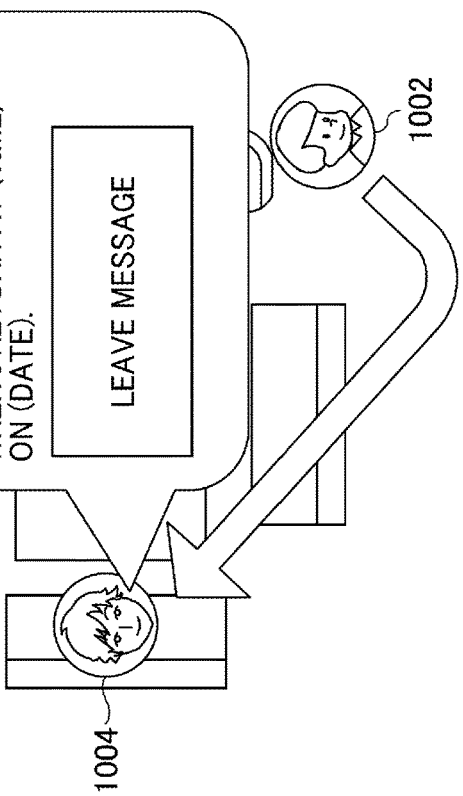
FIG. 8A
FIG. 8B

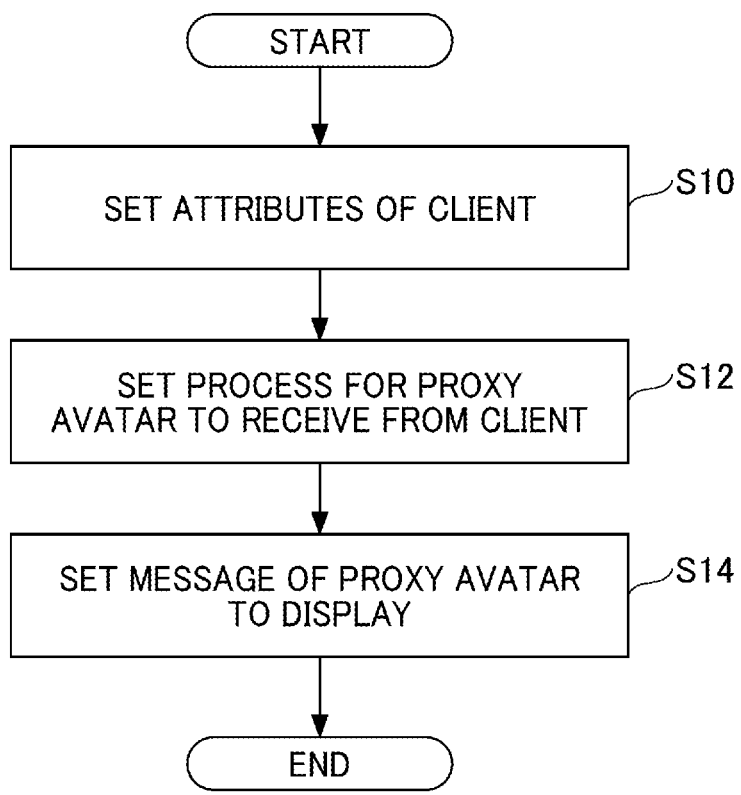

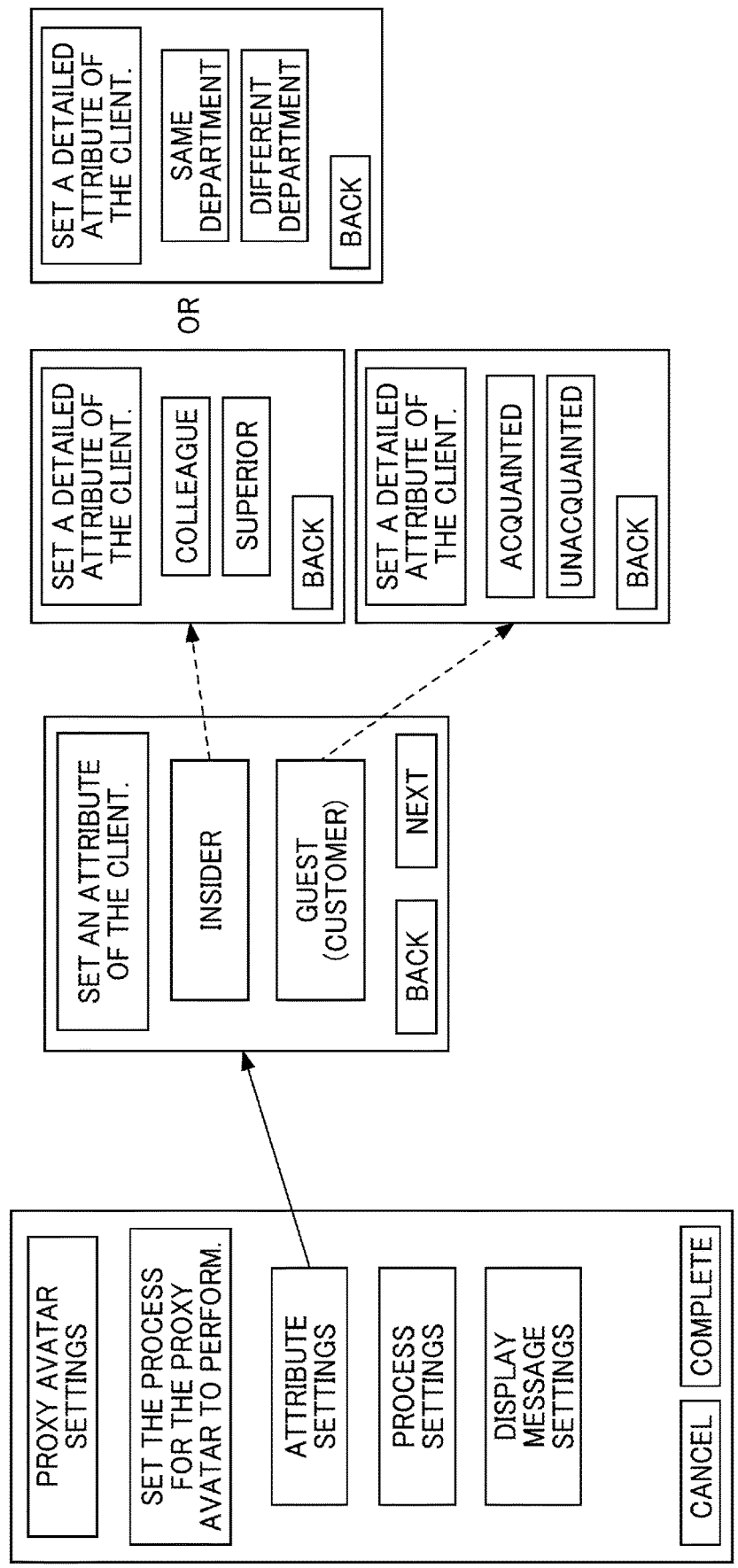

FIG. 15

| ATTRIBUTE A1 (ORGANIZATION) | ATTRIBUTE A2 | OPTIONS | SETTING ITEMS | PROCESS TO EXECUTE | NEXT ACTION |
|---|---|---|---|---|---|
| INSIDER | N/A | LEAVE MESSAGE | 1-1. TEXT INPUT FIELD | 1-1-1. TEXT STORAGE AND NOTIFICATION | N/A |
| | | COORDINATE SCHEDULE | 2-1. FIELD FOR ENTERING DESIRED PERIOD (DAY OR TIME RANGE) | 2-1-1. STORING HISTORY OF SCHEDULE INQUIRIES | 2-1-1-1. REQUEST TO CHECK SCHEDULER |
| | | SHARE INFORMATION | 3-1. INFORMATION SUMMARY INPUT FIELD AND SOURCE (e.g., URL) INPUT FIELD | 3-1-1. STORING INFORMATION IN SHARED INFORMATION STORAGE LOCATION | 3-1-1-1. PRESENT SHARED INFORMATION STORAGE LOCATION |
| | | PREPARE MATERIALS | 4-1. SUMMARY OF MATERIALS TO PREPARE<br>4-2. DEADLINE FOR SUBMITTING MATERIALS<br>4-3. SUBMISSION ADDRESS OF MATERIALS | 4-1-1. REGISTRATION OF REQUEST REFERENCE LOCATION OBJECT | 4-1-1-1. REQUEST TO PREPARE MATERIALS |
| OUTSIDER | N/A | LEAVE MESSAGE | 1-2. RECORDING START OBJECT | 1-2-1. AUDIO STORAGE AND NOTIFICATION | N/A |

FIG. 16

| ATTRIBUTE A1 (ORGANIZATION) | ATTRIBUTE A2 (POSITION) | OPTIONS | SETTING ITEMS | PROCESS TO EXECUTE | NEXT ACTION |
|---|---|---|---|---|---|
| INSIDER | SAME OR LOWER POSITION | LEAVE MESSAGE | 1-2. RECORDING START OBJECT | 1-2-1. AUDIO STORAGE AND NOTIFICATION | N/A |
| | | COORDINATE SCHEDULE | 2-1. FIELD FOR ENTERING DESIRED PERIOD (DAY OR TIME RANGE) | 2-1-1. STORING HISTORY OF SCHEDULE INQUIRIES | 2-1-1-1. REQUEST TO CHECK SCHEDULER |
| | HIGHER POSITION (BOSS/ SUPERIOR) | LEAVE MESSAGE | 1-1. TEXT INPUT FIELD | 1-1-1. TEXT STORAGE AND NOTIFICATION | N/A |
| | | COORDINATE SCHEDULE | 2-2. DISPLAY OF CALENDAR OR SCHEDULER | 2-2-1. TENTATIVE BOOKING | 2-2-1-1. REQUEST TO CONFIRM SCHEDULE |
| | | SHARE INFOR- MATION | 3-1. INFORMATION SUMMARY INPUT FIELD AND SOURCE (e.g., URL) INPUT FIELD<br>3-2. RECOMMENDED MEMBERS TO SHARE INFORMATION | 3-1-1. STORING INFORMATION IN SHARED INFORMATION STORAGE LOCATION<br>3-1-2. SHARING INFORMATION WITH RECOMMENDED MEMBERS | 3-1-1-1. PRESENT SHARED INFORMATION STORAGE LOCATION<br>3-1-2-1. REQUEST TO SHARE INFORMATION WITH RECOMMENDED MEMBERS |
| | | PREPARE MATERIALS | 4-1. SUMMARY OF MATERIALS TO PREPARE<br>4-2. DEADLINE FOR SUBMITTING MATERIALS<br>4-3. SUBMISSION ADDRESS OF MATERIALS | 4-1-1. REGISTRATION OF REQUEST REFERENCE LOCATION OBJECT | 4-1-1-1. REQUEST TO PREPARE MATERIALS |
| OUTSIDER | NO DIVISION | LEAVE MESSAGE | 1-2. RECORDING START OBJECT | 1-2-1. AUDIO STORAGE AND NOTIFICATION | N/A |

FIG. 17

| ATTRIBUTE A1 (ORGANIZATION) | ATTRIBUTE A2 (DEPARTMENT) | OPTIONS | SETTING ITEMS | PROCESS TO EXECUTE | NEXT ACTION |
|---|---|---|---|---|---|
| INSIDER | SAME DEPARTMENT | LEAVE MESSAGE | 1-1. TEXT INPUT FIELD | 1-1-1. TEXT STORAGE AND NOTIFICATION | N/A |
| | | COORDINATE SCHEDULE | 2-2. DISPLAY OF CALENDAR OR SCHEDULER | 2-2-1. TENTATIVE BOOKING | 2-2-1-1. REQUEST TO CONFIRM SCHEDULE |
| | | SHARE INFORMATION | 3-1. INFORMATION SUMMARY INPUT FIELD AND SOURCE (e.g., URL) INPUT FIELD | 3-1-1. STORING INFORMATION IN SHARED INFORMATION STORAGE LOCATION | 3-1-1-1. PRESENT SHARED INFORMATION STORAGE LOCATION |
| | | PREPARE MATERIALS | 4-1. SUMMARY OF MATERIALS TO PREPARE<br>4-2. DEADLINE FOR SUBMITTING MATERIALS<br>4-3. SUBMISSION ADDRESS OF MATERIALS<br>4-4. URL OF REFERENCE INFORMATION | 4-1-1. REGISTRATION OF REQUEST REFERENCE LOCATION OBJECT | 4-1-1-1. REQUEST TO PREPARE MATERIALS |
| | DIFFERENT DEPARTMENT | LEAVE MESSAGE | 1-1. TEXT INPUT FIELD | 1-1-1. TEXT STORAGE AND NOTIFICATION | N/A |
| | | COORDINATE SCHEDULE | 2-1. FIELD FOR ENTERING DESIRED PERIOD (DAY OR TIME RANGE) | 2-1-1. STORING HISTORY OF SCHEDULE INQUIRIES | 2-1-1-1. REQUEST TO CHECK SCHEDULER |
| OUTSIDER | | LEAVE MESSAGE | 1-2. RECORDING START OBJECT | 1-2-1. AUDIO STORAGE AND NOTIFICATION | N/A |

FIG. 18

| ATTRIBUTE A1 (ORGANIZATION, DEPARTMENT) | ATTRIBUTE A2 (ACQUAINTANCE) | OPTIONS | SETTING ITEMS | PROCESS TO EXECUTE | NEXT ACTION |
|---|---|---|---|---|---|
| INSIDER | N/A | LEAVE MESSAGE | 1-1. TEXT INPUT FIELD | 1-1-1. TEXT STORAGE AND NOTIFICATION | N/A |
| | | COORDINATE SCHEDULE | 2-1. FIELD FOR ENTERING DESIRED PERIOD (DAY OR TIME RANGE) | 2-1-1. STORING HISTORY OF SCHEDULE INQUIRIES | 2-1-1-1. REQUEST TO CHECK SCHEDULER |
| | | SHARE INFORMATION | 3-1. INFORMATION SUMMARY INPUT FIELD AND SOURCE (e.g., URL) INPUT FIELD | 3-1-1. STORING INFORMATION IN SHARED INFORMATION STORAGE LOCATION | 3-1-1-1. PRESENT SHARED INFORMATION STORAGE LOCATION |
| | | PREPARE MATERIALS | 4-1. SUMMARY OF MATERIALS TO PREPARE<br>4-2. DEADLINE FOR SUBMITTING MATERIALS<br>4-3. SUBMISSION ADDRESS OF MATERIALS | 4-1-1. REGISTRATION OF REQUEST REFERENCE LOCATION OBJECT | 4-1-1-1. REQUEST TO PREPARE MATERIALS |
| OUTSIDER | UNACQUAINTED | LEAVE MESSAGE | 1-1. TEXT INPUT FIELD | 1-1-1. TEXT STORAGE AND NOTIFICATION | N/A |
| | ACQUAINTED | LEAVE MESSAGE | 1-2. RECORDING START OBJECT | 1-2-1. AUDIO STORAGE AND NOTIFICATION | N/A |
| | | SHARE INFORMATION | 3-1. INFORMATION SUMMARY INPUT FIELD AND SOURCE (e.g., URL) INPUT FIELD | 3-1-1. STORING INFORMATION IN SHARED INFORMATION STORAGE LOCATION | 3-1-1-1. PRESENT SHARED INFORMATION STORAGE LOCATION |

FIG. 30

SCENARIO EXECUTION RESULT

| TIME OF RECEIPT | CLIENT | ITEM | STATUS | DEGREE OF URGENCY | NEXT ACTION | | | |
|---|---|---|---|---|---|---|---|---|
| 18:32 | MR. CCC, DDD CORPORATION | MESSAGE | RESPONDED | C | — | DETAIL | ACTION | PLAY |
| 19:25 | MS. EEE (COLLEAGUE) | SCHEDULE | NOT RESPONDED | B | ARRANGE MEETING (START ONLINE MEETING SUPPORT TOOL) | DETAIL | ACTION | PLAY |
| 20:14 | MR. FFF (BOSS) | SHARING INFORMATION | NOT RESPONDED | B | SHARE INFORMATION WITH TEAM (SEND EMAIL TO TEAM MEMBERS) | DETAIL | ACTION | PLAY |
| 21:45 | MR. FFF (BOSS) | PREPARING MATERIALS | INSTRUCTION RECEIVED | A | PREPARE MATERIALS (START "ACCESS") | DETAIL | ACTION | PLAY |
| ... | ... | ... | ... | ... | ... | DETAIL | ACTION | PLAY |

[SORT BY PRIORITY] [SORT BY URGENCY] [SORT BY CLIENT]

INFORMATION PROCESSING APPARATUS, INFORMATION PROCESSING SYSTEM, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2022-030029, filed on Feb. 28, 2022, in the Japan Patent Office, the entire disclosure of which is hereby incorporated by reference herein.

BACKGROUND

Technical Field

Embodiments of this disclosure relate to an information processing apparatus, an information processing system, and an information processing method.

Related Art

In virtual space based on computer graphics technology, users communicate with each other by causing avatars thereof to participate in the virtual space.

Since communication in real space is diverse depending on relationships between people, it is desirable that such diverse communication be also reflected in the virtual space.

SUMMARY

In one embodiment of this invention, there is provided an information processing apparatus that includes, for example, circuitry that invokes and causes a proxy avatar to participate in a virtual space. The proxy avatar represents a first user, and is proxy for a user avatar that participates in the virtual space. In response to receipt from a second user of a request to the proxy avatar, the circuitry executes a process based on the request based on information of a process to be performed by the proxy avatar. The information of the process is set in accordance with attribute information of the second user.

In one embodiment of this invention, there is provided an information processing system that includes, for example, the above-described information processing apparatus and a user terminal communicably connected to the information processing apparatus and operated by the first user. The user terminal includes another circuitry that causes a display to display the virtual space for the user avatar and the proxy avatar to participate in, and receives an operation performed on the user avatar or the proxy avatar by the first user.

In one embodiment of this invention, there is provided an information processing apparatus that includes, for example, circuitry that invokes and causes a proxy avatar to participate in a virtual space. The proxy avatar represents a first user, and is proxy for a user avatar that participates in the virtual space. In response to receipt of a request to the proxy avatar, based on a determination that attribute information of a user making the request indicates the user of the proxy avatar, the circuitry executes a process based on the request based on information of a process to be performed by the proxy avatar. The information of the process is set in accordance with attribute information of the user of the proxy avatar.

In one embodiment of this invention, there is provided an information processing method that includes, for example, invoking and causing a proxy avatar to participate in a virtual space. The proxy avatar represents a first user, and is proxy for a user avatar that participates in the virtual space. The information processing method further includes, in response to receipt from a second user of a request to the proxy avatar, executing a process based on the request based on information of a process to be performed by the proxy avatar. The information of the process is set in accordance with attribute information of the second user.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 4A and 4B are tables illustrating exemplary configurations of user information of the first embodiment;

FIG. 5 is a table illustrating an exemplary configuration of virtual space information of the first embodiment;

FIG. 6 is a table illustrating an exemplary configuration of avatar information of the first embodiment;

FIG. 7 is a diagram illustrating an example of a virtual space of the first embodiment;

FIGS. 8A and 8B are diagrams illustrating an exemplary overview of a proxy avatar of the first embodiment;

FIG. 9 is a flowchart illustrating an example of a scenario information setting process of the first embodiment;

FIG. 10 is a diagram illustrating an example of client attribute setting of the first embodiment;

FIG. 15 is a table illustrating an exemplary configuration of scenario information of the embodiment based on whether a client is an insider user in a company of the user or an outsider user;

FIG. 16 is a table illustrating an exemplary configuration of the scenario information of the first embodiment based on whether the client is the insider user in the company of the user or the outsider user and the position of the insider user;

FIG. 17 is a table illustrating an exemplary configuration of the scenario information of the first embodiment based on whether the client is the insider user in the company of the user or the outsider user and the department of the insider user;

FIG. 18 is a table illustrating an exemplary configuration of the scenario information of the first embodiment based on whether the client is the insider user in the company of the user or the outsider user and the acquaintance with the outsider user;

FIG. 30 is a diagram illustrating an example of a scenario execution result screen of the first embodiment;

Figure 1:
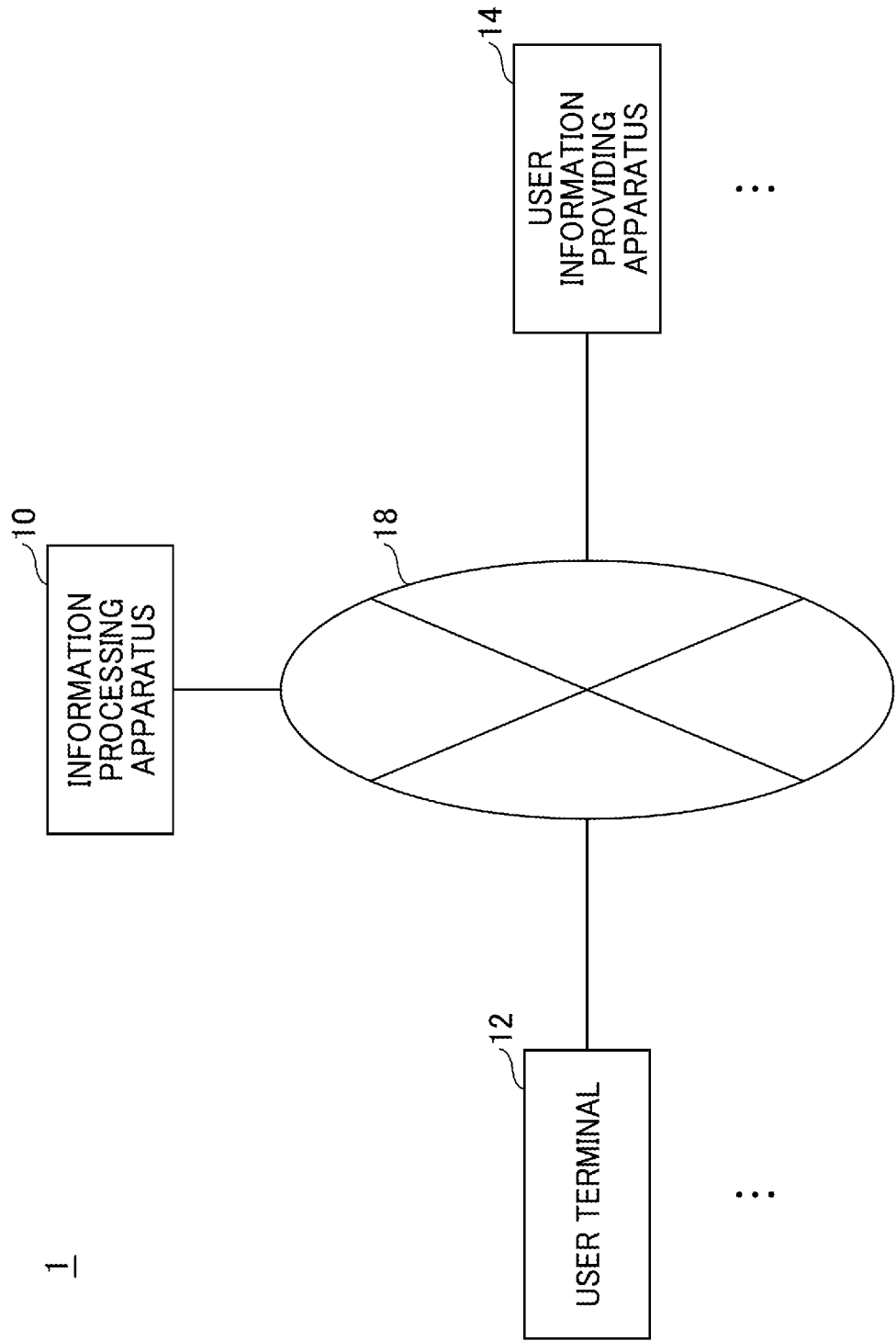
FIG. 1 is a diagram illustrating an exemplary configuration of an information processing system according to a first embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A system configuration of an information processing system according to a first embodiment of the present invention will first be described.

FIG. 1 is a diagram illustrating an exemplary configuration of an information processing system 1 of the first embodiment. The information processing system 1 in FIG. 1 includes an information processing apparatus 10, one or more user terminals 12, and one or more user information providing apparatuses 14, which communicate with each other via a network 18. The network 18 is the Internet or a local area network (LAN), for example.

The information processing apparatus 10 performs a process to cause the user terminal 12 to display a virtual space. The virtual space is a space built in a computer or a computer network, and is different from the real space. In the present embodiment, the virtual space is a space in which each of multiple users participates as an avatar representing the user to communicate with the other users via the avatar.

The information processing apparatus 10 is a personal computer (PC) or a workstation, for example. The information processing apparatus 10 may also be implemented by a server, an application service provider (ASP), or cloud computing, for example.

The user terminal 12 is an information processing terminal operated by a user. The user operates the user terminal 12 to cause the avatar thereof to participate in the virtual space to communicate with other users. The user terminal 12 is a PC, a mobile phone, a smartphone, a tablet terminal, a gaming system, or a personal digital assistant (PDA), for example.

The user information providing apparatus 14 provides user information of the users who cause the avatars thereof to participate in the virtual space. The user information providing apparatus 14 is an apparatus that provides the user information used to determine the relationship between the users. The user information used to determine the relationship between the users includes, for example, account information and personnel information of the users.

The configuration of the information processing system 1 illustrated in FIG. 1 is illustrative. For example, at least part of functions of the information processing apparatus 10 may be included in the user terminal 12 or the user information providing apparatus 14. Further, the information processing apparatus 10 and the user information providing apparatus 14 may be integrated. Furthermore, the functions of the information processing apparatus 10 may be distributed to and implemented by a plurality of computers.

Hardware configurations of the information processing apparatus 10, the user information providing apparatus 14, and the user terminal 12 will be described.

Figure 2:
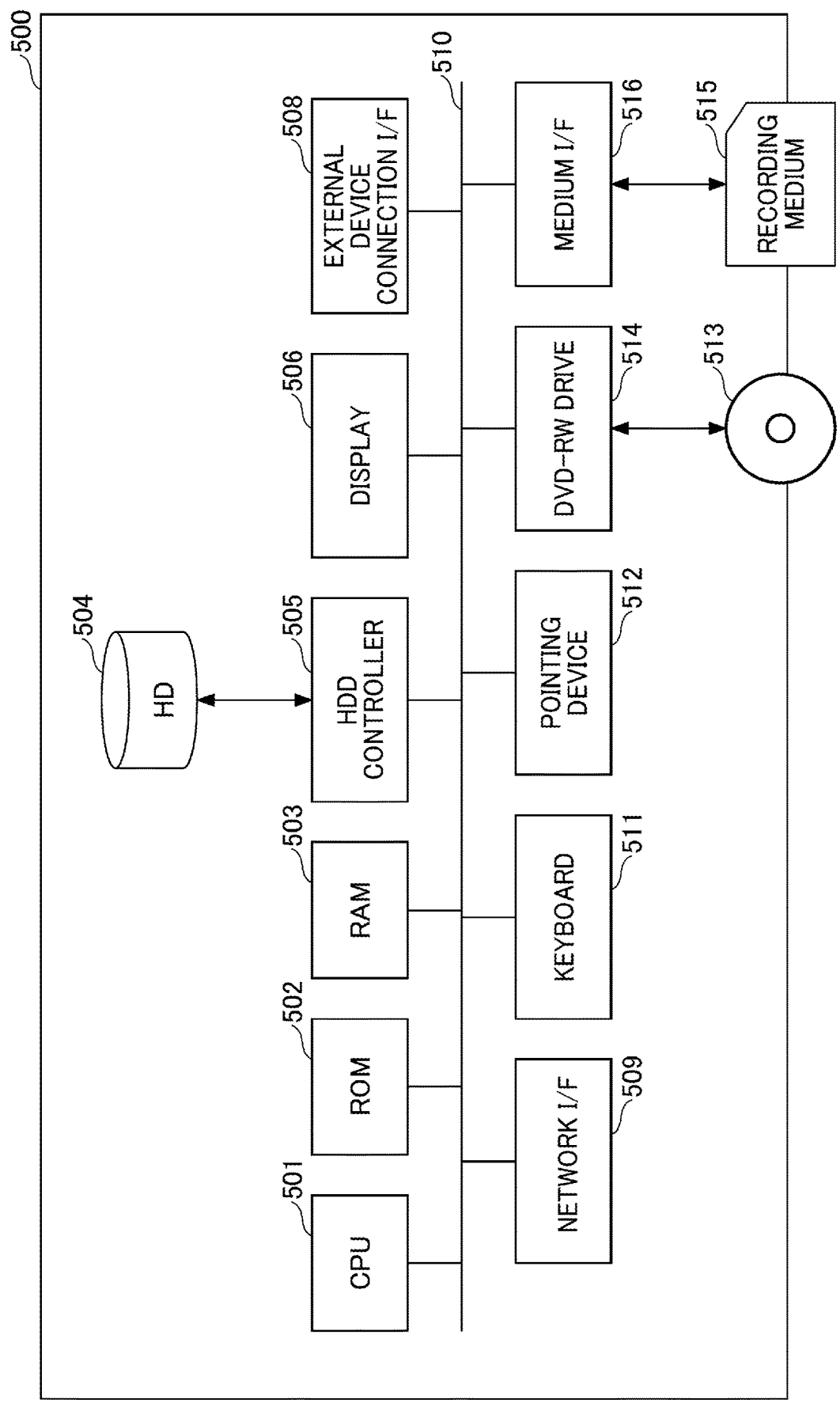
FIG. 2 is a diagram illustrating an exemplary hardware configuration of a computer included in the information processing system of the first embodiment.

Each of the information processing apparatus 10 and the user information providing apparatus 14 in FIG. 1 is implemented by a computer 500 with the hardware configuration illustrated in FIG. 2, for example. If the user terminal 12 in FIG. 1 is implemented by a PC, the user terminal 12 is also implemented by the computer 500 with the hardware configuration in FIG. 2, for example. FIG. 2 is a diagram illustrating an exemplary hardware configuration of the computer 500 of the present embodiment.

The computer 500 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disc-rewritable (DVD-RW) drive 514, and a medium I/F 516.

The CPU 501 controls overall operation of the computer 500 in accordance with programs. The ROM 502 stores a program used to drive the CPU 501, such as an initial program loader (IPL). The RAM 503 is used as a working area of the CPU 501. The HD 504 stores various data of programs, for example. The HDD controller 505 controls writing and reading of various data to and from the HD 504 under the control of the CPU 501.

The display 506 displays various information such as a cursor, menus, windows, text, and images. The display 506 may be a head-mounted display (HMD) or a head-up display (HUD), for example. The external device connection I/F 508 is an interface for connecting various external devices to the computer 500. The external devices in this case include a universal serial bus (USB) memory, for example.

The network I/F 509 is an interface for performing data communication via the network 18. The data bus 510 includes address buses and data buses for electrically connecting the CPU 501 and the other components to each other.

The keyboard 511 is an input device including a plurality of keys for inputting text, numerical values, and various instructions, for example. The pointing device 512 is an input device for selecting and executing various instructions, selecting a processing target, and moving the cursor, for example. The DVD-RW drive 514 controls writing and reading of various data to and from a DVD-RW 513 as an example of a removable recording medium. The removable recording medium is not limited to the DVD-RW, and may be a DVD-recordable (DVD-R), for example. The medium I/F 516 controls writing (i.e., storage) and reading of data to and from a recording medium 515 such as a flash memory.

The hardware configuration of the computer 500 illustrated in FIG. 2 is illustrative. The computer 500 is not necessarily required to include all of the components illustrated in FIG. 2. Further, the computer 500 may include a component other than those illustrated in FIG. 2. If the user terminal 12 in FIG. 1 is other than a PC, various hardware configurations are conceivable for the user terminal 12, and thus the illustration thereof is omitted here.

A description will be given of a functional configuration of the information processing system 1 of the present embodiment.

Figure 3:
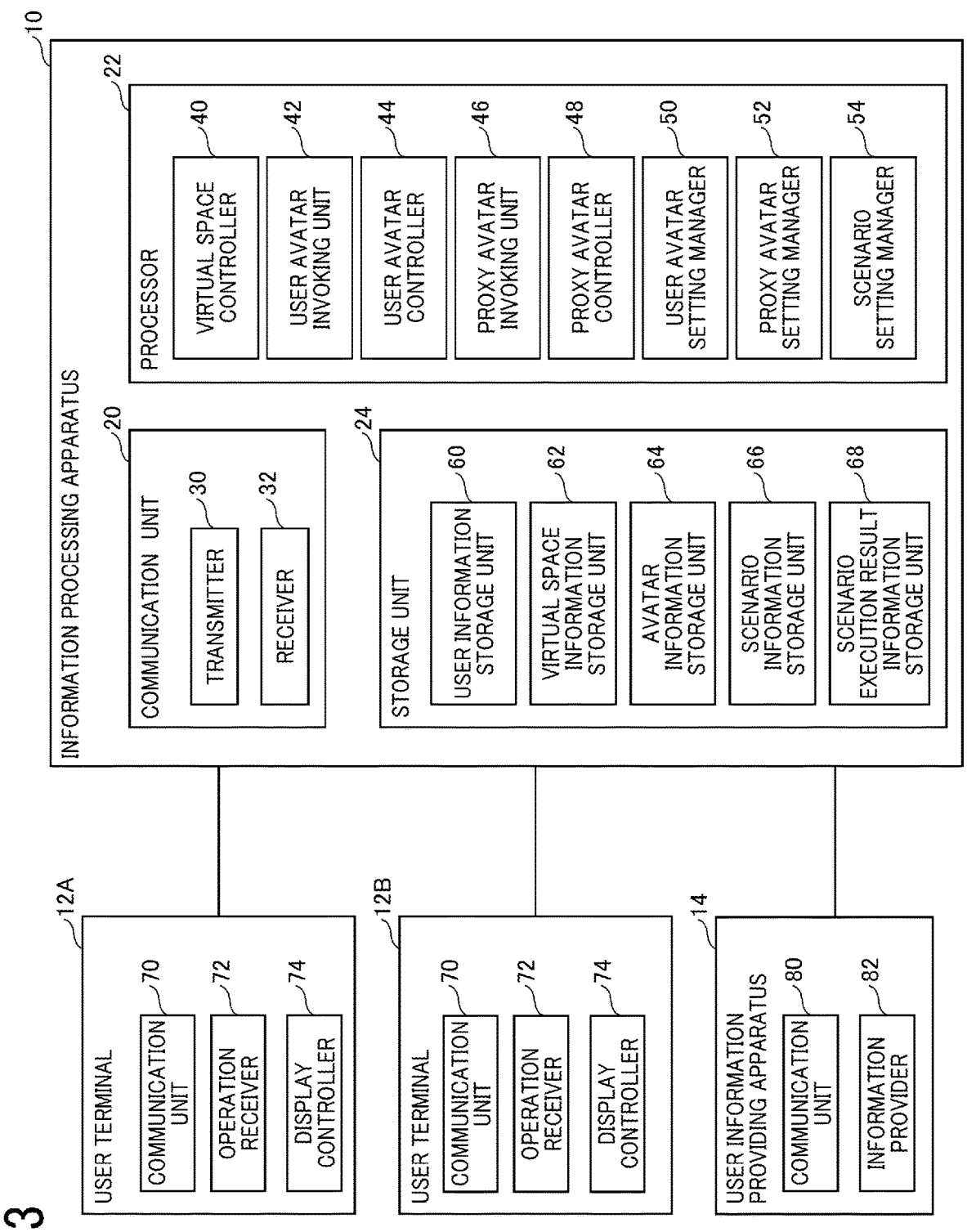
FIG. 3 is a diagram illustrating an exemplary functional configuration of the information processing system of the first embodiment.

The information processing system 1 of the present embodiment is implemented by the functional configuration illustrated in FIG. 3, for example. FIG. 3 is a diagram illustrating an exemplary functional configuration of the information processing system 1 of the present embodiment. In the functional configuration diagram of FIG. 3, functions of the information processing system 1 unrelated to the following description of the present embodiment are omitted as appropriate. In the present example, the information processing system 1 includes a user terminal 12A and a user terminal 12B as the user terminals 12. The information processing apparatus 10, the user terminals 12A and 12B, and the user information providing apparatus 14 execute programs, such as operating systems (OSs) and applications, to implement the functional configuration of FIG. 3, for example. In the following description, the user terminals 12A and 12B may be collectively referred to as the user terminals 12.

Each of the user terminals 12 includes a communication unit 70, an operation receiver 72, and a display controller 74. The communication unit 70 communicates with the information processing apparatus 10. The operation receiver 72 receives operations performed by a user and performs various processes in accordance with the operations. The display controller 74 displays the virtual space based on virtual space data received from the information processing apparatus 10, for example.

The user information providing apparatus 14 includes a communication unit 80 and an information provider 82. The communication unit 80 communicates with the information processing apparatus 10. The information provider 82 provides the information processing apparatus 10 with the user information.

The information processing apparatus 10 includes a communication unit 20, a processor 22, and a storage unit 24. The communication unit 20 includes a transmitter 30 and a receiver 32. The processor 22 includes a virtual space controller 40, a user avatar invoking unit 42, a user avatar controller 44, a proxy avatar invoking unit 46, a proxy avatar controller 48, a user avatar setting manager 50, a proxy avatar setting manager 52, and a scenario setting manager 54. The storage unit 24 includes a user information storage unit 60, a virtual space information storage unit 62, an avatar information storage unit 64, a scenario information storage unit 66, and a scenario execution result information storage unit 68.

The communication unit 20 controls the communication with the user terminal 12 or the user information providing apparatus 14. The transmitter 30 of the communication unit 20 transmits information or data to the user terminal 12 or the user information providing apparatus 14. For example, the transmitter 30 transmits the virtual space data to the user terminal 12 to cause the user terminal 12 to display the virtual space. The receiver 32 of the communication unit 20 receives information or data from the user terminal 12 or the user information providing apparatus 14. For example, the receiver 32 receives, from the user terminal 12, an operation performed by the user on an avatar in the virtual space.

The processor 22 performs various processes related to the virtual space participated by a user avatar and a proxy avatar. The user avatar is an avatar directly operated by the user. The proxy avatar is an avatar proxy for the user avatar of the user. The proxy avatar is invoked in the virtual space and then is mechanically operated in accordance with scenario information. The proxy avatar is implemented by an artificial intelligence (AI) technology, a robotic process automation (RPA) technology, or a robot (BOT) technology, for example.

The virtual space controller 40 controls the virtual space displayed on the user terminal 12. The user avatar invoking unit 42 invokes the user avatar of the user in the virtual space, i.e., causes the user avatar to participate in the virtual space. The user avatar controller 44 performs control related to the user avatar invoked in the virtual space. The proxy avatar invoking unit 46 invokes the proxy avatar of the user in the virtual space, i.e., causes the proxy avatar to participate in the virtual space. The proxy avatar controller 48 performs control related to the proxy avatar invoked in the virtual space.

The user avatar setting manager 50 manages the settings of avatar information related to the user avatar. The proxy avatar setting manager 52 manages the settings of avatar information related to the proxy avatar. The scenario setting manager 54 manages the settings related to the scenario information.

The user information storage unit 60 of the storage unit 24 stores the user information illustrated in FIG. 4A or FIG. 4B, for example. FIGS. 4A and 4B are tables illustrating exemplary configurations of the user information. The user information in FIG. 4A includes items "USER" and "ACCOUNT." The user information in FIG. 4B includes items "USER," "ACCOUNT," "DEPARTMENT," and "POSITION."

The item "USER" is an example of identification information of the user operating the user terminal 12. The item "ACCOUNT," which is account information of the user operating the user terminal 12, is an example of attribute information of the user. The item "DEPARTMENT," which is department information of the user operating the user terminal 12, is an example of the attribute information of the user. The item "POSITION," which is position information of the user operating the user terminal 12, is an example of the attribute information of the user. The information processing apparatus 10 determines the relationship between the users based on the user information in FIG. 4A or 4B.

The virtual space information storage unit 62 of the storage unit 24 stores the virtual space information illustrated in FIG. 5, for example. FIG. 5 is a table illustrating an exemplary configuration of the virtual space information. The virtual space information in FIG. 5 includes items "USER," "VIRTUAL SPACE TO CONNECT TO," and "IMAGE DATA." The item "USER" is an example of the identification information of the user operating the user terminal 12. The item "VIRTUAL SPACE TO CONNECT TO" is an example of identification information of the virtual space associated with the user identified by the item "USER." The item "IMAGE DATA" is an example of the virtual space data used to cause the user terminal 12 of the user identified by the item "USER" to display the virtual space. Based on the user information in FIG. 5, the information processing apparatus identifies the virtual space according to the user, and causes the user terminal 12 to display the identified virtual space.

The avatar information storage unit 64 of the storage unit 24 stores the avatar information illustrated in FIG. 6, for example. FIG. 6 is a table illustrating an exemplary configuration of the avatar information. The avatar information in FIG. 6 includes items "USER," "USER AVATAR IDENTIFIER (ID)," "USER AVATAR IMAGE," "PROXY AVATAR ID," "PROXY AVATAR IMAGE," and "SCENARIO ID."

The item "USER" is an example of the identification information of the user operating the user terminal 12. The item "USER AVATAR ID" is an example of identification information of the user avatar. The item "USER AVATAR IMAGE" is an example of information representing image data of the user avatar. The item "PROXY AVATAR ID" is an example of identification information of the proxy avatar. The item "PROXY AVATAR IMAGE" is an example of information representing image data of the proxy avatar. The item "SCENARIO ID" is an example of identification information for identifying the scenario information of the proxy avatar. Based on the avatar information in FIG. 6, the information processing apparatus 10 identifies the user avatar and the proxy avatar according to the user, and identifies the scenario information of the proxy avatar.

The scenario information storage unit 66 of the storage unit 24 stores the scenario information associated with the scenario ID. The scenario execution result information storage unit 68 of the storage unit 24 stores scenario execution result information of the proxy avatar mechanically operated in accordance with the scenario information.

A process of the information processing system 1 of the present embodiment will be described.

FIG. 7 is a diagram illustrating an example of the virtual space. FIG. 7 illustrates a virtual space 1000. The virtual space 1000 is expressed two-dimensionally in the example of FIG. 7, but may also be expressed three-dimensionally. In the example described below, a user A operating the user terminal 12A (an example of a first user) and a user B operating the user terminal 12B (an example of a second user) participate in the virtual space 1000 of FIG. 7 with respective avatars thereof. The user B is an example of a third-party user.

For example, the users A and B may participate in the virtual space 1000 of FIG. 7 with the user or proxy avatars thereof. The users A and B may participate in the virtual space 1000 of FIG. 7 with the user avatars thereof and communicate with each other by directly operating the user avatars. The users A and B may also cause the proxy avatars thereof to participate in the virtual space 1000 of FIG. 7 during the absence of the user avatars from the virtual space 1000, such as when the users A and B are away from the desk or office, for example.

The following description will be given of an example in which the user A causes a proxy avatar 1004 thereof to participate in the virtual space 1000 of FIG. 7 and the user B causes a user avatar 1002 thereof to participate in the virtual space 1000. The designs of the proxy avatar 1004 and the user avatar 1002 in FIG. 7 are illustrative. For example, the design of the proxy avatar 1004 may be different from or the same as that of the user avatar of the user A.

The participation of the user avatar 1002 or the proxy avatar 1004 in the virtual space 1000 may be executed by dragging and dropping an icon of the user avatar 1002 or the proxy avatar 1004 into the virtual space 1000, selecting an option from a menu, or previously setting the time to participate in the virtual space 1000.

The proxy avatar 1004 of the user A responds to requests from the user avatar 1002 of the user B in accordance with the scenario information, enabling diverse communication based on the relationship between the users A and B. The relationship between the users A and B from the perspective of the user A is identifiable in accordance with the attribute information. The attribute information includes, for example, whether the user B is an insider or outsider of the company to which the user A belongs, whether the position of the user B is the same as or lower than that of the user A or higher than that of the user A, whether the department of the user B is in the same as or different from that of the user A, and whether the user A is acquainted or unacquainted with the user B. The scenario information is an example of the process to be performed by the proxy avatar 1004 of the user A. The process is set in accordance with the attribute information of the user B, i.e., the third-party user other than the user A.

The user A may cause the proxy avatar 1004 to participate in the virtual space 1000 during the time in which the user A is away from the desk or during the off-work hours, for example, to establish an environment responsive to the requests from the user B during the unavailability of the user A.

The user B operates the user terminal 12B to move the user avatar 1002 participating in the virtual space 1000. To make a request to the user A, the user B moves the user avatar 1002 thereof to approach or contact the proxy avatar 1004 of the user A, as illustrated in FIG. 8A or FIG. 8B, for example. The operation performed by the user B to move the user avatar 1002 to approach or contact the proxy avatar 1004 of the user A is illustrative, and may be a different operation.

FIGS. 8A and 8B are diagrams illustrating an exemplary overview of the proxy avatar 1004. Detecting the approach or contact of the user avatar 1002 of the user B, the proxy avatar 1004 of the user A executes different processes, as illustrated in FIGS. 8A and 8B, for example, in accordance with the relationship between the users A and B.

FIG. 8A illustrates an example in which the proxy avatar 1004 takes a message from the user B operating the user avatar 1002 in accordance with the relationship between the users A and B. The example of FIG. 8A is for the case in which, from the perspective of the user A, the user B is an outsider of the company to which the user A belongs. In this case, the message of the proxy avatar 1004 displayed in a box 1003 is designed for the outsider user.

FIG. 8B illustrates an example in which the proxy avatar 1004 receives, from the user B operating the user avatar 1002, a request to leave a message, coordinate schedule, share information, or prepare materials in accordance with the relationship between the users A and B. The example of FIG. 8B is for the case in which, from the perspective of the user A, the user B is an insider of the company to which the user A belongs. In this case, the message of the proxy avatar 1004 displayed in the box 1003 is designed for the insider user.

As described above, the proxy avatar 1004 of the user A responding to the request from the user B changes the message to display in the box 1003 and the type of process to receive from the user B in accordance with the relationship between the users A and B. For example, the proxy avatar 1004 of the user A is set to behave as closely as possible to how the user A usually behaves toward the user B.

When the user A returns to the virtual space 1000 with the user avatar thereof, the user A takes over the request of the user B received by the proxy avatar 1004 of the user A.

The process to be performed by the proxy avatar 1004 of the user A is previously set as the scenario information. The setting of the scenario information is executed with the procedure illustrated in the flowchart of FIG. 9, for example. FIG. 9 is a flowchart illustrating an example of the process of setting the scenario information. The following description will be given of an example in which the user A sets the scenario information of the proxy avatar 1004 of the user A. Alternatively, the scenario information may be set by an administrator of the information processing system 1, for example.

At step S10, the user A sets attributes of a client. Herein, the client is a person who makes a request to the proxy avatar 1004, such as the user B, for example. The setting of the attributes of the client is executed under the control of the scenario setting manager 54 with the procedure illustrated FIG. 10, for example.

FIG. 10 is a diagram illustrating exemplary setting of the attributes of the client. In the example of FIG. 10, when an "ATTRIBUTE SETTINGS" button is selected in a proxy avatar setting screen, the options of the attributes of the client are interactively displayed. For instance, in the example of FIG. 10, the user A is prompted to select between an insider and a guest (e.g., a customer outside the company of the user A) to set the client as an insider user inside the company or an outsider user outside the company such as a customer outside the company. Further, in the example of FIG. 10, when the client is an insider user, the user A is further prompted to set the client as a colleague or a superior or as a member of the same department as that of the user A or a member of a department different from that of the user A. When the client is an outsider user, the user A is further prompted to set the client as an acquainted user or an unacquainted user in the example of FIG. 10.

The example of FIG. 10 is illustrative, and the process following the selection between an insider and a guest (e.g., a customer outside the company of the user A) may be omitted to simply set whether the client is an insider user or an outsider user.

Returning to step S12 in FIG. 9, the user A then sets the process to be performed by the proxy avatar 1004. The setting of the process to be performed by the proxy avatar 1004 is executed under the control of the scenario setting manager 54 with the procedure illustrated in FIG. 11, for example.

Figure 11:
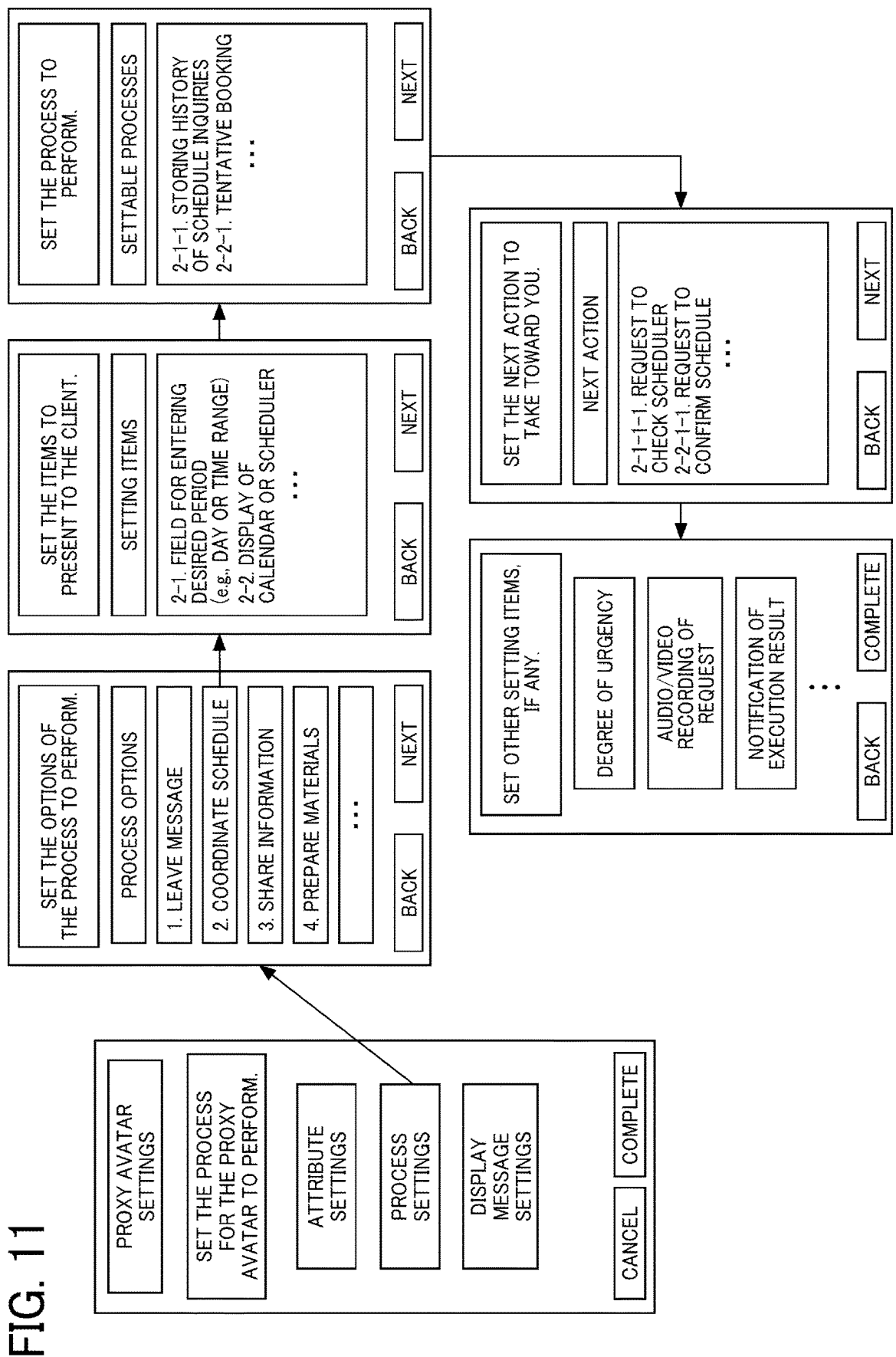
FIG. 11 is a diagram illustrating an example of the setting of a process to be performed by the proxy avatar of the first embodiment.

FIG. 11 is a diagram illustrating an example of the setting of the process to be performed by the proxy avatar 1004. In the example of FIG. 11, when a "PROCESS SETTINGS" button is selected in the proxy avatar setting screen, the options of the process to be performed by the proxy avatar 1004 are interactively displayed.

For instance, in the example of FIG. 11, the options of the process to be performed by the proxy avatar 1004 are displayed to prompt the user A to make selections related to setting items, settable processes, the next action, and other setting items, thereby prompting the user A to set the process to be performed by the proxy avatar 1004. For "TENTATIVE BOOKING" in "SETTABLE PROCESSES" in FIG. 11, an application or service for causing the proxy avatar 1004 to perform a schedule registration operation may be previously determined or may be set by the user A. For "NOTIFICATION OF EXECUTION RESULT" in "OTHER SETTING ITEMS" in FIG. 11, the user A may set the notification by electronic mail or the notification by the proxy avatar 1004 when the user A returns to the virtual space 1000 with the user avatar thereof, for example.

Figure 12:
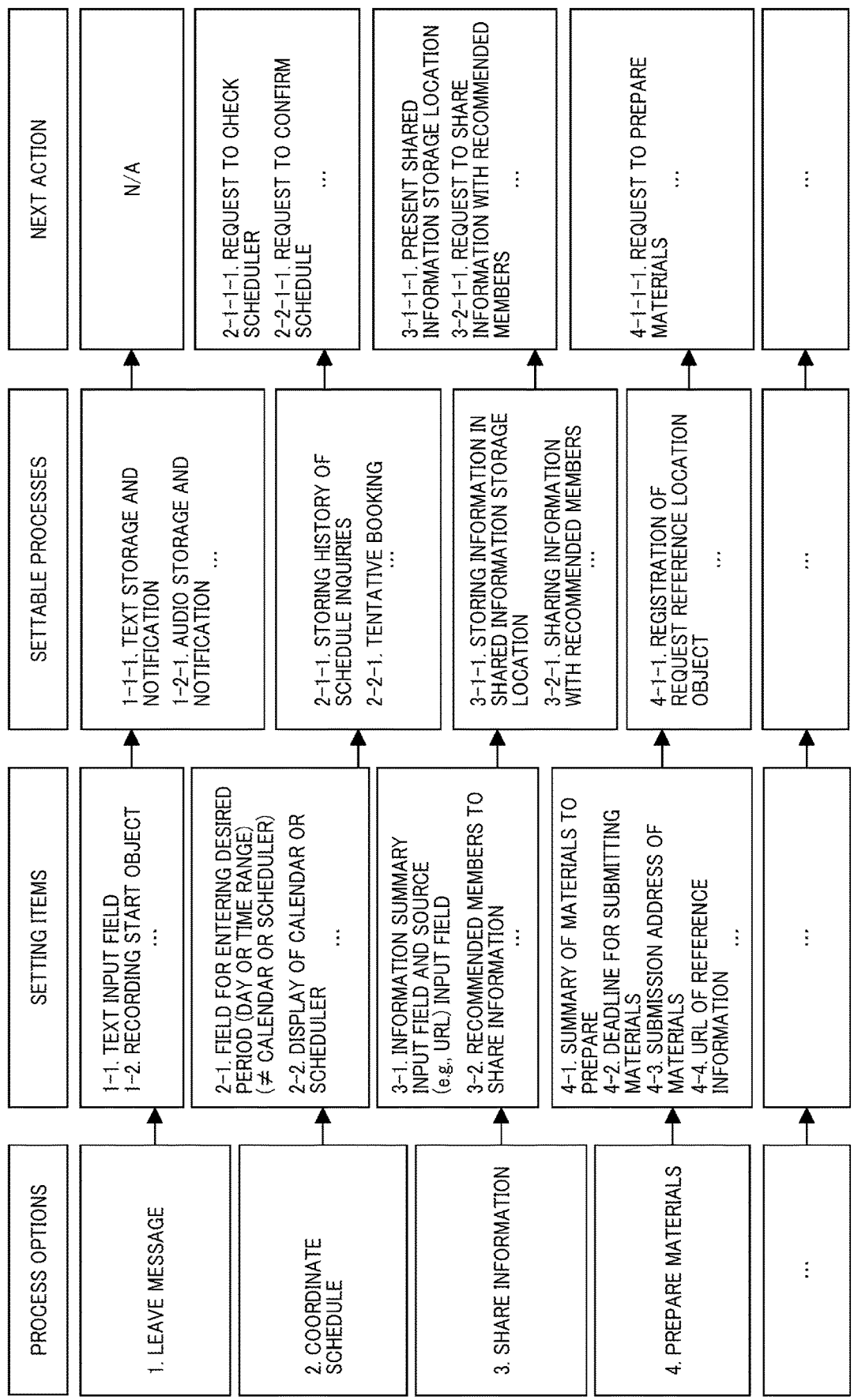
FIG. 12 is a diagram illustrating an exemplary configuration of the process of the proxy avatar set by a user in the first embodiment.

FIG. 12 is a diagram illustrating an exemplary configuration of the process of the proxy avatar 1004 set by the user A. As illustrated in FIG. 12, the options of the setting items, the options of the settable processes, and the options of the next action are set in association with the options of the process.

In the setting items, one or more items (i.e., available items) to provide to the client are registered as the options for each of the options of the process. For instance, in the example of FIG. 12, setting items "TEXT INPUT FIELD" and "RECORDING START OBJECT" are registered as the options of "LEAVE MESSAGE," which is one of the options of the process.

In the settable processes, one or more processes to be performed by the proxy avatar 1004 are registered as the options for each of the options of the setting items. For instance, in the example of FIG. 12, settable processes "TEXT STORAGE AND NOTIFICATION" and "AUDIO STORAGE AND NOTIFICATION" are registered as options.

In the next action, one or more actions to take toward the user A in response to the return of the user avatar of the user A to the virtual space 1000 are registered as the options. The registration of the next action is optional. For instance, in the example of FIG. 12, no option of the next action is registered for "LEAVE MESSAGE," which is one of the options of the process. Further, in the example of FIG. 12, "REQUEST TO CHECK SCHEDULER" and "REQUEST TO CONFIRM SCHEDULE" are registered as the options of the next action for "COORDINATE SCHEDULE," which is another one of the options of the process. Actions such as displaying a message and displaying a link (e.g., a uniform resource locator (URL) or an object such as a button or icon) to the corresponding process may also be registered as the options of the next action.

In the example of FIG. 11, "DEGREE OF URGENCY," "AUDIO/VIDEO RECORDING OF REQUEST," and "NOTIFICATION OF EXECUTION RESULT" are registered as the options of the other setting items. Alternatively, the other setting items may be set as common items, as illustrated in FIG. 13, fort example.

Figure 13:
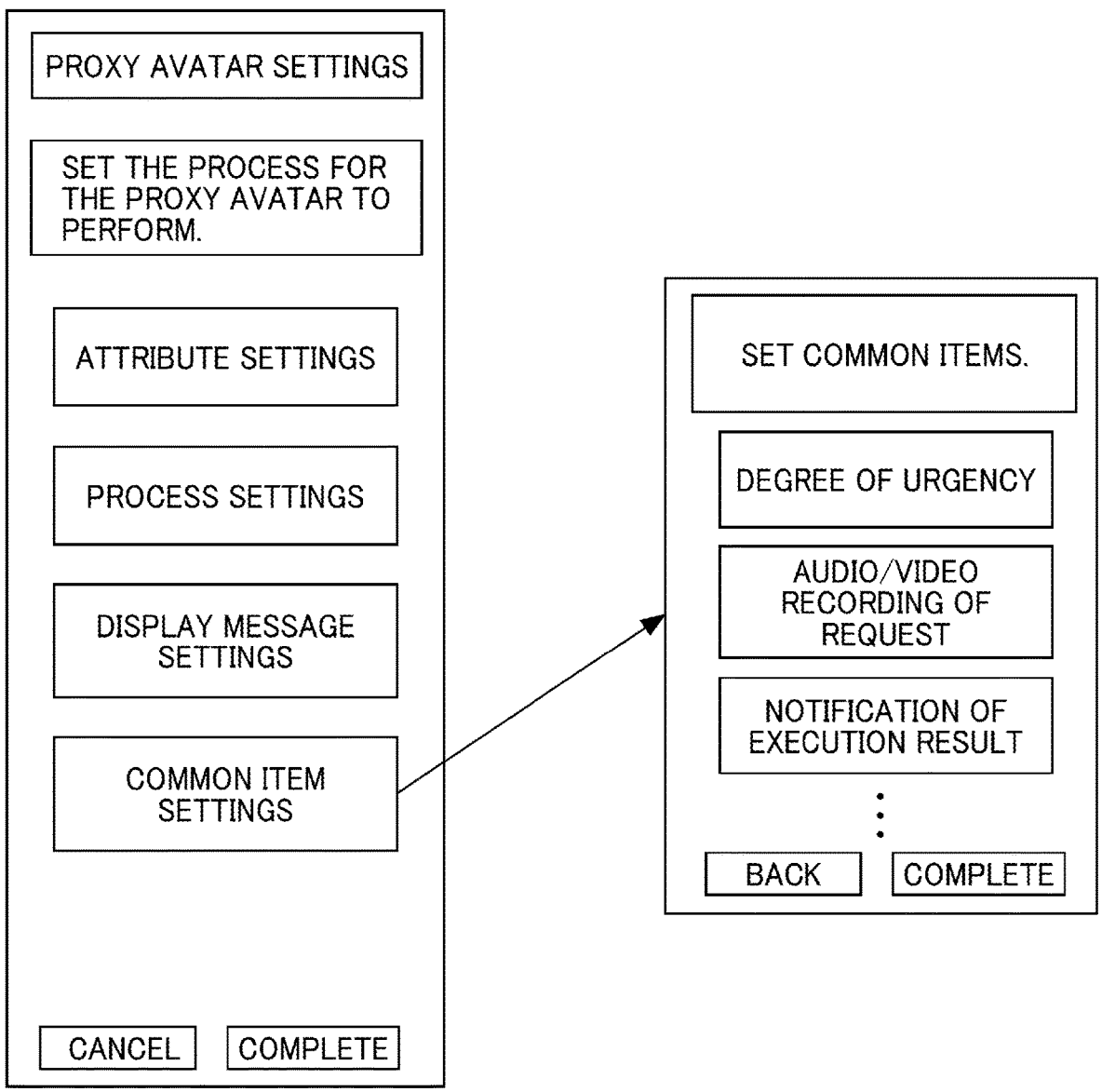
FIG. 13 is a diagram illustrating an example of the setting of common items applied to the process to be performed by the proxy avatar of the first embodiment.

FIG. 13 is a diagram illustrating an example of the setting of the common items applied to the process to be performed by the proxy avatar 1004. In the example of FIG. 13, when a "COMMON ITEM SETTINGS" button is selected in the proxy avatar setting screen, the options of the common items applied to the process to be performed by the proxy avatar 1004 are interactively displayed.

In the example of FIG. 13, "DEGREE OF URGENCY," "AUDIO/VIDEO RECORDING OF REQUEST," and "NOTIFICATION OF EXECUTION RESULT" are registered as the options of the common items. For example, the user A may select the common item "AUDIO/VIDEO RECORDING OF REQUEST" to record the audio or video of the situation in which the proxy avatar 1004 receives the request of the user B.

By checking the audio or video recording of the situation in which the proxy avatar 1004 receives the request of the user B, the user A may notice the presence of a person accompanying the client (e.g., a recruit, successor, boss, or referred client), for example, and realize the desirability of an action not included in the next action. The audio or video recording of the request may be set not as a setting item but as an item to be performed.

Returning to step S14 in FIG. 9, the user A sets the message of the proxy avatar 1004 to display. The message of the proxy avatar 1004 to display is set under the control of the scenario setting manager 54 with the procedure illustrated in FIG. 14, for example.

Figure 14:
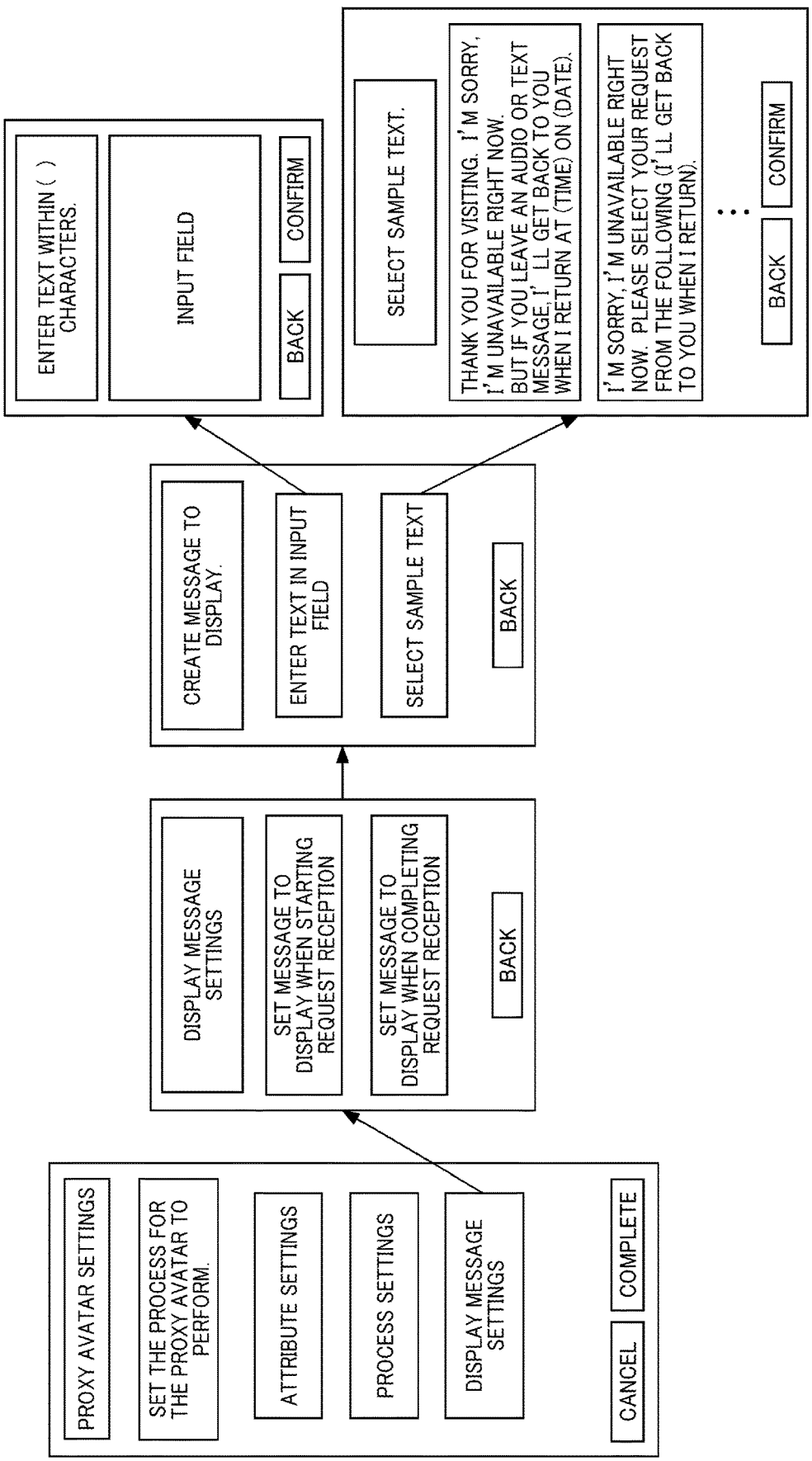
FIG. 14 is a diagram illustrating an example of the setting of a message to display in the first embodiment.

FIG. 14 is a diagram illustrating an example of the setting of the message to display. In the example of FIG. 14, when a "DISPLAY MESSAGE SETTINGS" button is selected in the proxy avatar setting screen, the options of the message of the proxy avatar 1004 to display in the box 1003 (see FIGS. 8A and 8B), for example, are interactively displayed.

For instance, the example of FIG. 14 is for receiving the setting of the message to display when the client starts the request and the message to display when the client completes the request. The user A selects the setting of the message to display when the client starts the request or the setting of the message to display when the client completes the request. The user A then selects entering text in an input field or selecting a sample message, to thereby set the message to display. In the example of FIG. 14, the message to display when the client starts the request or the message to display when the client completes the request is selected to set the message to display. Alternatively, the message to display when the client starts the request and the message to display when the client completes the request may be set in succession.

The proxy avatar setting screen illustrated in FIGS. 10, 11, 13, and 14 is used to make selections related to the attribute settings, the process settings, the display message settings, and the common item settings. The configuration of the proxy avatar setting screen, however, is not limited thereto.

For example, the "ATTRIBUTE SETTINGS" button may be removed from the proxy avatar setting screen. In this case, the selection of the "PROCESS SETTINGS" button or the "DISPLAY MESSAGE SETTINGS" button by the user A may be followed by the attribute setting process of FIG. 10 and then by the process setting process of FIG. 11 or the display message setting process of FIG. 14. Further, in the scenario information set with the procedure illustrated in the flowchart of FIG. 9, the options of the process, the setting items, the settable processes, and the next action may be limited in accordance with the attributes of the client. For example, the attributes of the client, for whom the scenario information is set with the procedure illustrated in the flowchart of FIG. 9, may be limited to the insider user. Further, in the scenario information set with the procedure illustrated in the flowchart of FIG. 9, the options of the response of the proxy avatar 1004 may be more limited for the outsider client than for the insider client.

The scenario information set with the procedure illustrated in the flowchart of FIG. 9 is stored in the scenario information storage unit 66 for each user operating a proxy avatar thereof, for example. The scenario information may be defined in accordance with the attributes of the client, as illustrated in FIG. 15, 16, 17, or 18, for example.

FIG. 15 is a table illustrating an exemplary configuration of the scenario information according to whether the client is the insider user or the outsider user. The scenario information in FIG. 15 is defined in accordance with whether the attribute of the client is the insider user or the outsider user. For example, if the client is the insider user, the scenario information in FIG. 15 is defined to cause the proxy avatar 1004 to receive the request to leave a message, coordinate schedule, share information, or prepare materials. Further, if the client is the outsider user, the scenario information in FIG. 15 is defined to cause the proxy avatar 1004 to receive the request to leave a message.

FIG. 16 is a table illustrating an exemplary configuration of the scenario information according to whether the client is the insider user or the outsider user and the position of the insider user. In the example of the scenario information in FIG. 16, the attributes of the client are defined as an attribute A1 and an attribute A2. In the present example, the attribute A1 represents the organization of the client, and the attribute A2 represents the position of the client. The scenario information in FIG. 16 is defined with the attributes of the client categorized into the insider user in a position the same as or lower than that of the user A, the insider user in a position higher than that of the user A, and the outsider user. For example, if the client is the insider user in a position the same as or lower than that of the user A, the scenario information in FIG. 16 is defined to cause the proxy avatar 1004 to receive the request to leave a message or coordinate schedule. Further, if the client is the insider user in a position higher than that of the user A, the scenario information in FIG. 16 is defined to cause the proxy avatar 1004 to receive the request to leave a message, coordinate schedule, share information, or prepare materials. Furthermore, if the client is the outsider user, the scenario information in FIG. 16 is defined to cause the proxy avatar 1004 to receive the request to leave a message.

FIG. 17 is a table illustrating an exemplary configuration of the scenario information according to whether the client is the insider user or the outsider user and the department of the insider user. In the example of the scenario information in FIG. 17, the attributes of the client are defined as the attribute A1 and the attribute A2. In the present example, the attribute A1 represents the organization of the client, and the attribute A2 represents the department of the client. The scenario information in FIG. 17 is defined with the attributes of the client categorized into the insider user in the same department as that of the user A, the insider user in a department different from that of the user A, and the outsider user. For example, if the client is the insider user in the same department as that of the user A, the scenario information in FIG. 17 is defined to cause the proxy avatar 1004 to receive the request to leave a message, coordinate schedule, share information, or prepare materials. Further, if the client is the insider user in a department different from that of the user A, the scenario information in FIG. 17 is defined to cause the proxy avatar 1004 to receive the request to leave a message or coordinate schedule. Furthermore, if the client is the outsider user, the scenario information in the example of FIG. 17 is defined to cause the proxy avatar 1004 to receive the request to leave a message.

FIG. 18 is a table illustrating an exemplary configuration of the scenario information according to whether the client is the insider user or the outsider user and the acquaintance or unacquaintance with the outsider user. In the example of the scenario information in FIG. 18, the attributes of the client are defined as the attribute A1 and the attribute A2. In the present example, the attribute A1 represents the organization of the client, and the attribute A2 represents the acquaintance or unacquaintance with the client. The scenario information in FIG. 18 is defined with the attributes of the client categorized into the insider user, the unacquainted outsider user, and the acquainted outsider user.

If the client is the insider user, the scenario information in FIG. 18 is defined to cause the proxy avatar 1004 to receive the request to leave a message, coordinate schedule, share information, or prepare materials. If the client is the unacquainted outsider user, the scenario information in FIG. 18 is defined to cause the proxy avatar 1004 to receive the request to leave a message. Furthermore, if the client is the acquainted outsider user, the scenario information in FIG. 18 is defined to cause the proxy avatar 1004 to receive the request to leave a message or share information.

Whether the user A is acquainted or unacquainted with the client is determinable by various methods. For example, whether the user A is acquainted or unacquainted with the client may be determined with reference to user information such as whether the user A has exchanged business cards with the client, whether the user A has had an online meeting with the client, and whether the user A personally knows the client, for example.

With the scenario information defined as illustrated in FIG. 15, 16, 17, or 18, the proxy avatar 1004 of the present embodiment enables diverse communication in accordance with the attributes of the client.

Figure 19:
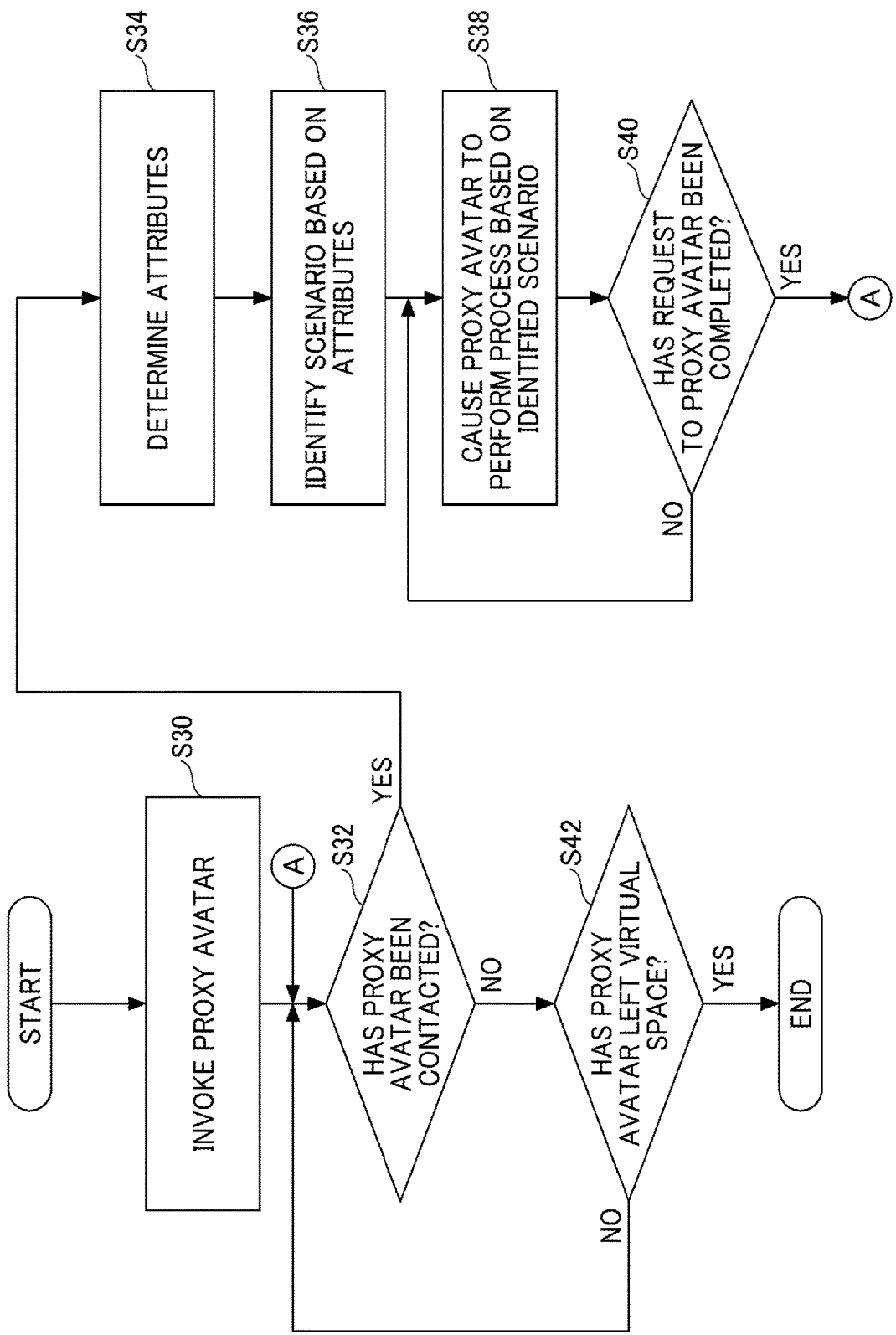
FIG. 19 is a flowchart illustrating an exemplary process of the first embodiment performed in the virtual space with the proxy avatar invoked therein.

FIG. 19 is a flowchart illustrating an exemplary process performed in the virtual space 1000 with the proxy avatar 1004 invoked therein. The following description will be given of an exemplary process performed in the virtual space 1000 illustrated in FIG. 7.

At step S30, the proxy avatar invoking unit 46 of the information processing apparatus 10 performs a process of invoking the proxy avatar 1004 of the user A in the virtual space 1000. Thereby, the proxy avatar 1004 of the user A participates in the virtual space 1000.

At step S32, the proxy avatar controller 48 of the information processing apparatus determines whether the user avatar 1002 of the user B has contacted (or approached a particular range from) the proxy avatar 1004 of the user A. If it is determined that the user avatar 1002 of the user B has contacted (or approached the particular range from) the proxy avatar 1004 of the user A (YES at step S32), the proxy avatar controller 48 performs the process of step S34.

At step S34, the proxy avatar controller 48 determines the attributes of the user B, who has contacted (or approached the particular range from) the proxy avatar 1004 of the user A with the user avatar 1002. The determination of the attributes at step S34 is executed as illustrated in FIG. 20, 21, 22, or 23, for example, in accordance with the definition of the scenario information illustrated in FIG. 15, 16, 17, or 18. FIGS. 20 to 23 are flowcharts illustrating examples of the attribute determination process.

Figure 20:
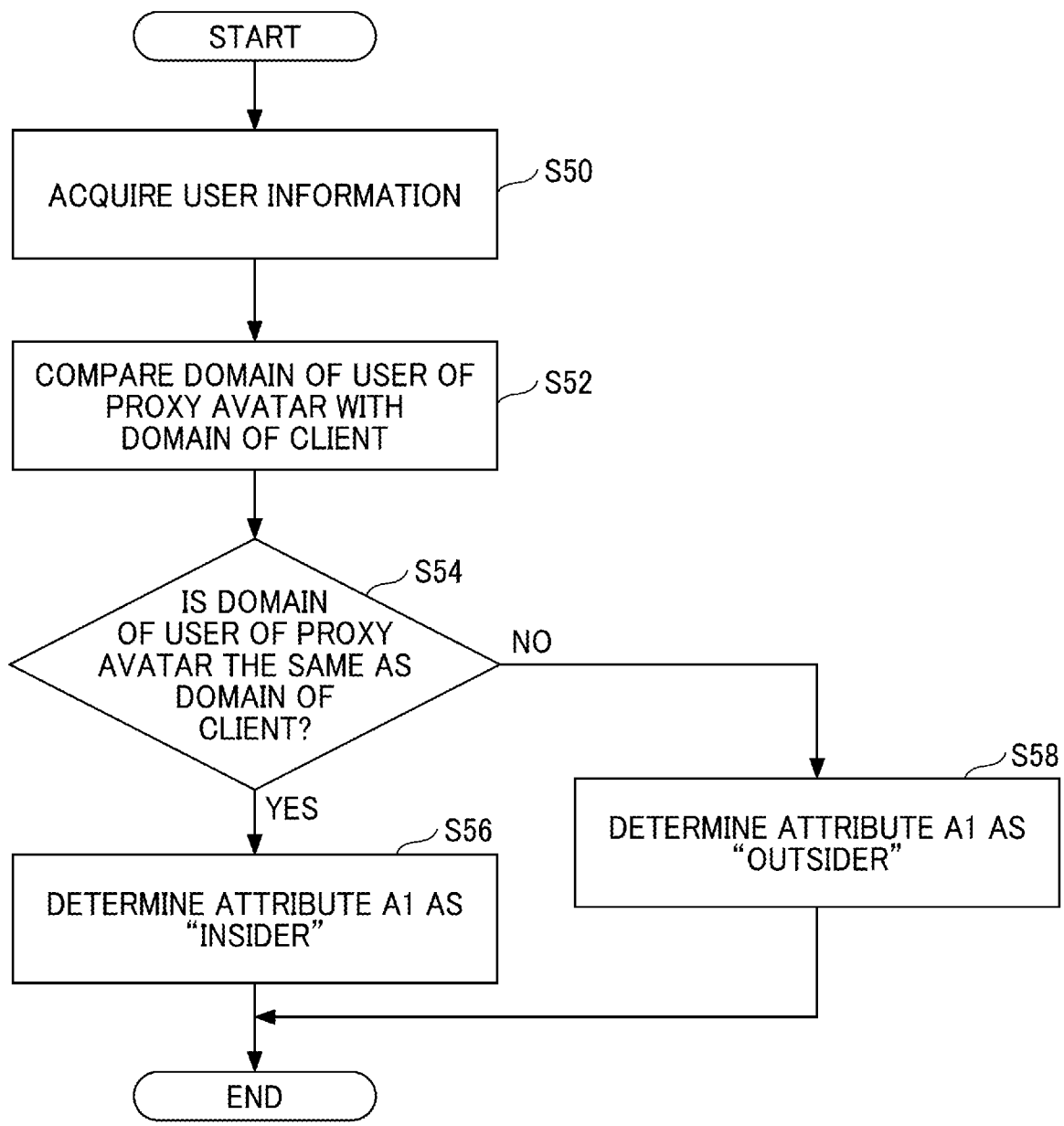
FIGS. 20, 21, 22, and 23 are flowcharts illustrating examples of an attribute determination process of the first embodiment.

In the case of the scenario information in FIG. 15, for example, the proxy avatar controller 48 determines the attributes of the user B with the procedure illustrated in FIG. 20.

At step S50, the proxy avatar controller 48 reads the user information of the user A of the proxy avatar 1004 and the user information of the user B of the user avatar 1002 from the user information storage unit 60. The proxy avatar controller 48 may request the user avatar 1002 of the user B to provide the account of the user B. In response to receipt of the request for the account, the user avatar 1002 of the user B may provide the proxy avatar controller 48 with the account input by the user B, for example.

At step S52, the proxy avatar controller 48 identifies the domain of the user A based on the account included in the user information of the user A read at step S50. The proxy avatar controller 48 further identifies the domain of the user B based on the account included in the user information of the user B read at step S50. The proxy avatar controller 48 then compares the domain of the user A of the proxy avatar 1004 with the domain of the user B, who is the client.

At step S54, the proxy avatar controller 48 determines whether the domain of the user A of the proxy avatar 1004 is the same as the domain of the user B as the client. If it is determined that the domain of the user A is the same as the domain of the user B (YES at step S54), the proxy avatar controller 48 proceeds to the process of step S56 to determine an attribute of the client, i.e., "ATTRIBUTE A1" in the scenario information of FIG. 15, as "INSIDER." If it is determined that the domain of the user A is different from the domain of the user B (NO at step S54), the proxy avatar controller 48 proceeds to the process of step S58 to determine an attribute of the client, i.e., "ATTRIBUTE A1" in the scenario information of FIG. 15, as "OUTSIDER."

Figure 21:
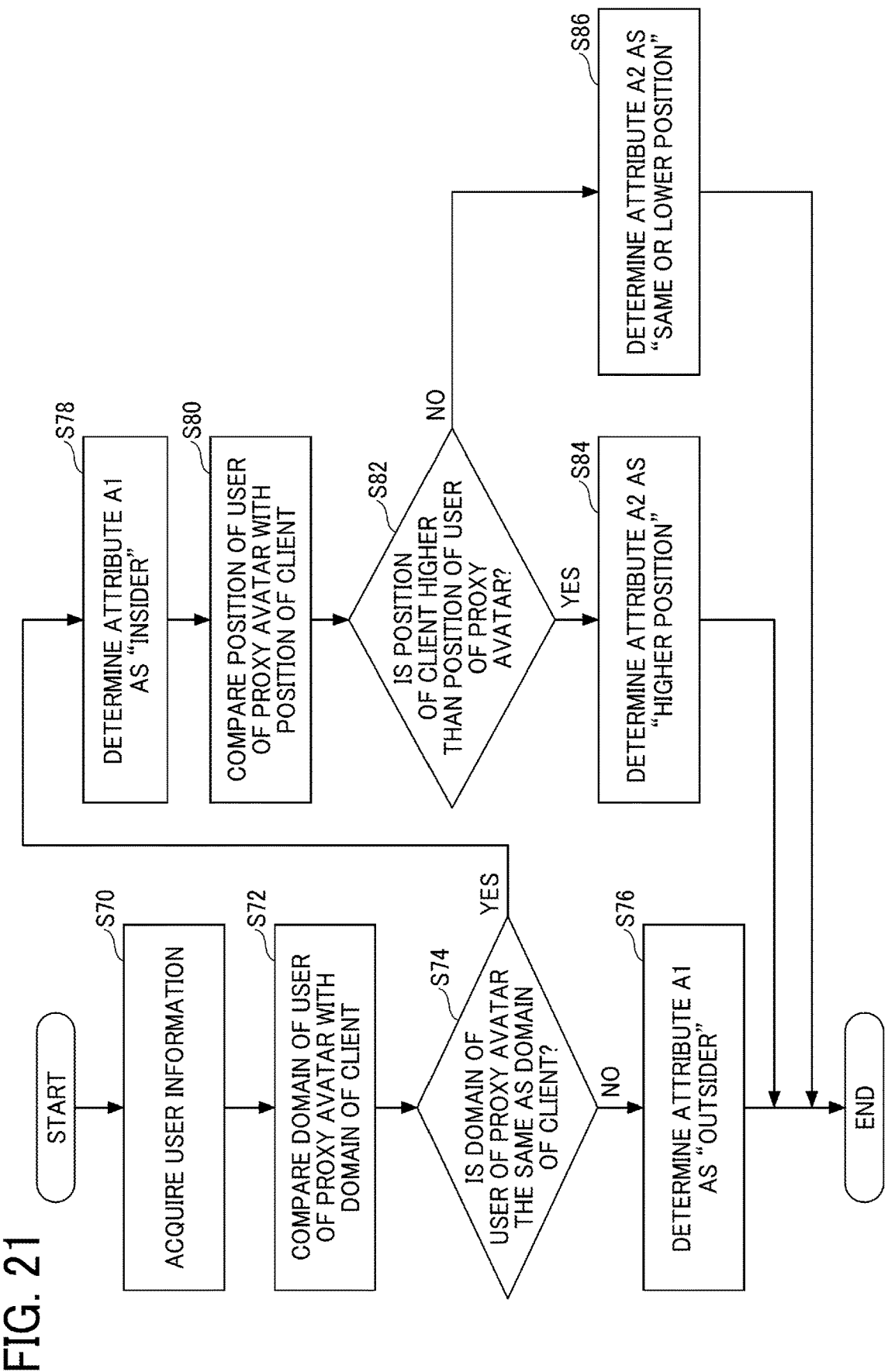

In the case of the scenario information in FIG. 16, for example, the proxy avatar controller 48 determines the attributes of the user B with the procedure illustrated in FIG. 21.

At step S70, the proxy avatar controller 48 reads the user information of the user A of the proxy avatar 1004 and the user information of the user B of the user avatar 1002 from the user information storage unit 60. The proxy avatar controller 48 may request the user avatar 1002 of the user B to provide the account of the user B. In response to receipt of the request for the account, the user avatar 1002 of the user B may provide the proxy avatar controller 48 with the account input by the user B, for example.

At step S72, the proxy avatar controller 48 identifies the domain of the user A based on the account included in the user information of the user A read at step S70. The proxy avatar controller 48 further identifies the domain of the user B based on the account included in the user information of the user B read at step S70. The proxy avatar controller 48 then compares the domain of the user A of the proxy avatar 1004 with the domain of the user B, who is the client.

At step S74, the proxy avatar controller 48 determines whether the domain of the user A of the proxy avatar 1004 is the same as the domain of the user B as the client. If it is determined that the domain of the user A is the same as the domain of the user B (YES at step S74), the proxy avatar controller 48 proceeds to the process of step S78 to determine an attribute of the client, i.e., "ATTRIBUTE A1" in the scenario information of FIG. 16, as "INSIDER." If it is determined that the domain of the user A is different from the domain of the user B (NO at step S74), the proxy avatar controller 48 proceeds to the process of step S76 to determine an attribute of the client, i.e., "ATTRIBUTE A1" in the scenario information of FIG. 16, as "OUTSIDER."

After determining an attribute of the client, i.e., "ATTRIBUTE A1" in the scenario information of FIG. 16, as "INSIDER" at step S78, the proxy avatar controller 48 proceeds to the process of step S80. At step S80, the proxy avatar controller 48 identifies the position of the user A from the user information of the user A read at step S70. The proxy avatar controller 48 further identifies the position of the user B from the user information of the user B read at step S70. The proxy avatar controller 48 then compares the position of the user A of the proxy avatar 1004 with the position of the user B as the client.

At step S82, the proxy avatar controller 48 determines whether the position of the user B as the client is higher than the position of the user A of the proxy avatar 1004. If it is determined that the position of the user B as the client is higher than the position of the user A of the proxy avatar 1004 (YES at step S82), the proxy avatar controller 48 proceeds to the process of step S84 to determine another attribute of the client, i.e., "ATTRIBUTE A2" in the scenario information of FIG. 16, as "HIGHER POSITION."

If it is determined that the position of the user B is not higher than the position of the user A (NO at step S82), the proxy avatar controller 48 proceeds to the process of step S86 to determine another attribute of the client, i.e., "ATTRIBUTE A2" in the scenario information of FIG. 16, as "SAME OR LOWER POSITION."

Figure 22:
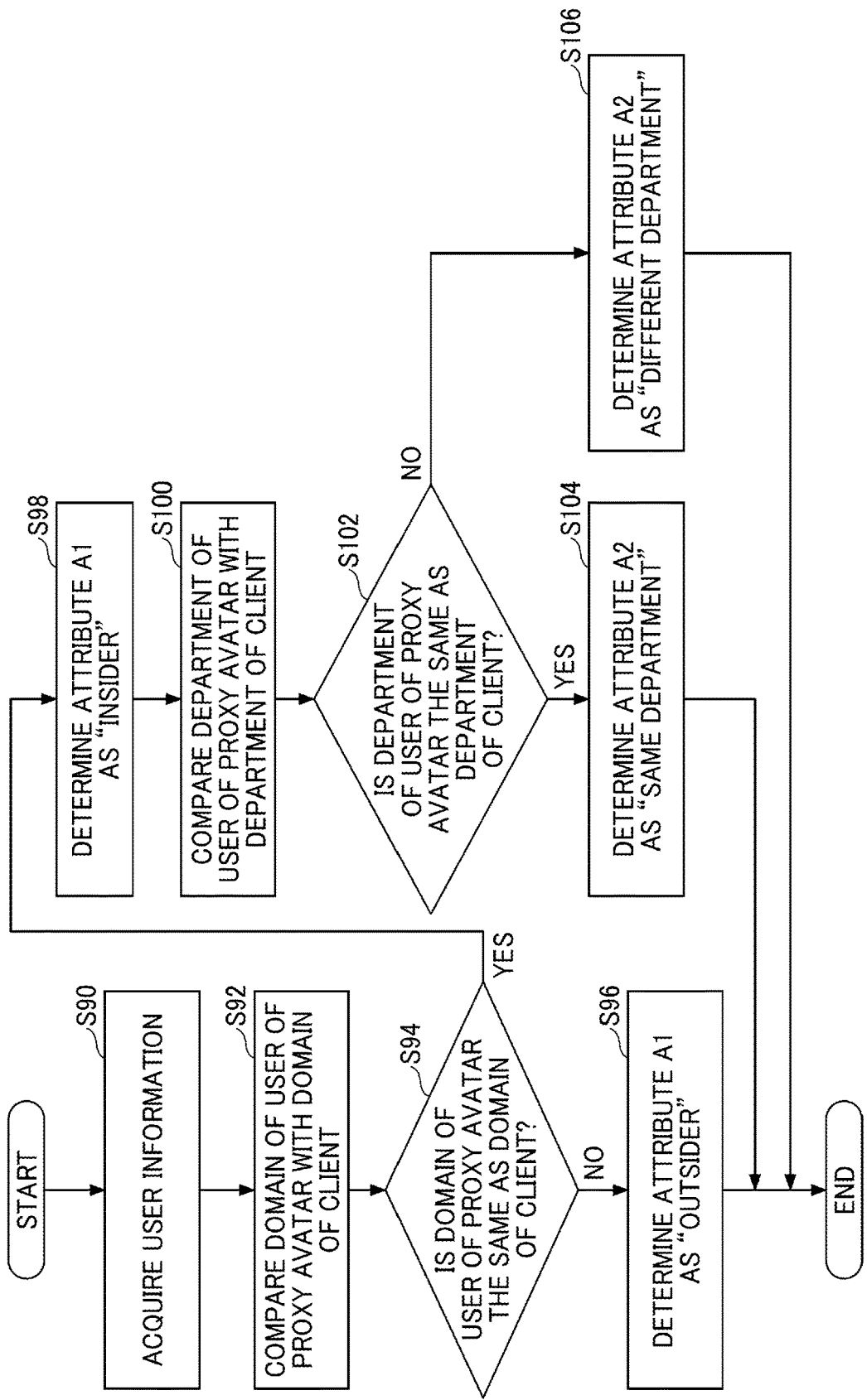

In the case of the scenario information in FIG. 17, for example, the proxy avatar controller 48 determines the attributes of the user B with the procedure illustrated in FIG. 22.

At step S90, the proxy avatar controller 48 reads the user information of the user A of the proxy avatar 1004 and the user information of the user B of the user avatar 1002 from the user information storage unit 60. The proxy avatar controller 48 may request the user avatar 1002 of the user B to provide the account of the user B. In response to receipt of the request for the account, the user avatar 1002 of the user B may provide the proxy avatar controller 48 with the account input by the user B, for example.

At step S92, the proxy avatar controller 48 identifies the domain of the user A based on the account included in the user information of the user A read at step S90. The proxy avatar controller 48 further identifies the domain of the user B based on the account included in the user information of the user B read at step S90. The proxy avatar controller 48 then compares the domain of the user A of the proxy avatar 1004 with the domain of the user B, who is the client.

At step S94, the proxy avatar controller 48 determines whether the domain of the user A of the proxy avatar 1004 is the same as the domain of the user B as the client. If it is determined that the domain of the user A is the same as the domain of the user B (YES at step S94), the proxy avatar controller 48 proceeds to the process of step S98 to determine an attribute of the client, i.e., "ATTRIBUTE A1" in the scenario information of FIG. 17, as "INSIDER." If it is determined that the domain of the user A is different from the domain of the user B (NO at step S94), the proxy avatar controller 48 proceeds to the process of step S96 to determine an attribute of the client, i.e., "ATTRIBUTE A1" in the scenario information of FIG. 17, as "OUTSIDER."

After determining an attribute of the client, i.e., "ATTRIBUTE A1" in the scenario information of FIG. 17, as "INSIDER" at step S98, the proxy avatar controller 48 proceeds to the process of step S100. At step S100, the proxy avatar controller 48 identifies the department of the user A from the user information of the user A read at step S90. The proxy avatar controller 48 further identifies the department of the user B from the user information of the user B read at step S90. The proxy avatar controller 48 then compares the department of the user A of the proxy avatar 1004 with the department of the user B as the client.

At step S102, the proxy avatar controller 48 determines whether the department of the user A of the proxy avatar 1004 is the same as the department of the user B as the client. If it is determined that the department of the user A of the proxy avatar 1004 is the same as the department of the user B as the client (YES at step S102), the proxy avatar controller 48 proceeds to the process of step S104 to determine another attribute of the client, i.e., "ATTRIBUTE A2" in the scenario information of FIG. 17, as "SAME DEPARTMENT."

If it is determined that the department of the user A of the proxy avatar 1004 is different from the department of the user B as the client (NO at step S102), the proxy avatar controller 48 proceeds to the process of step S106 to determine another attribute of the client, i.e., "ATTRIBUTE A2" in the scenario information of FIG. 17, as "DIFFERENT DEPARTMENT."

Figure 23:
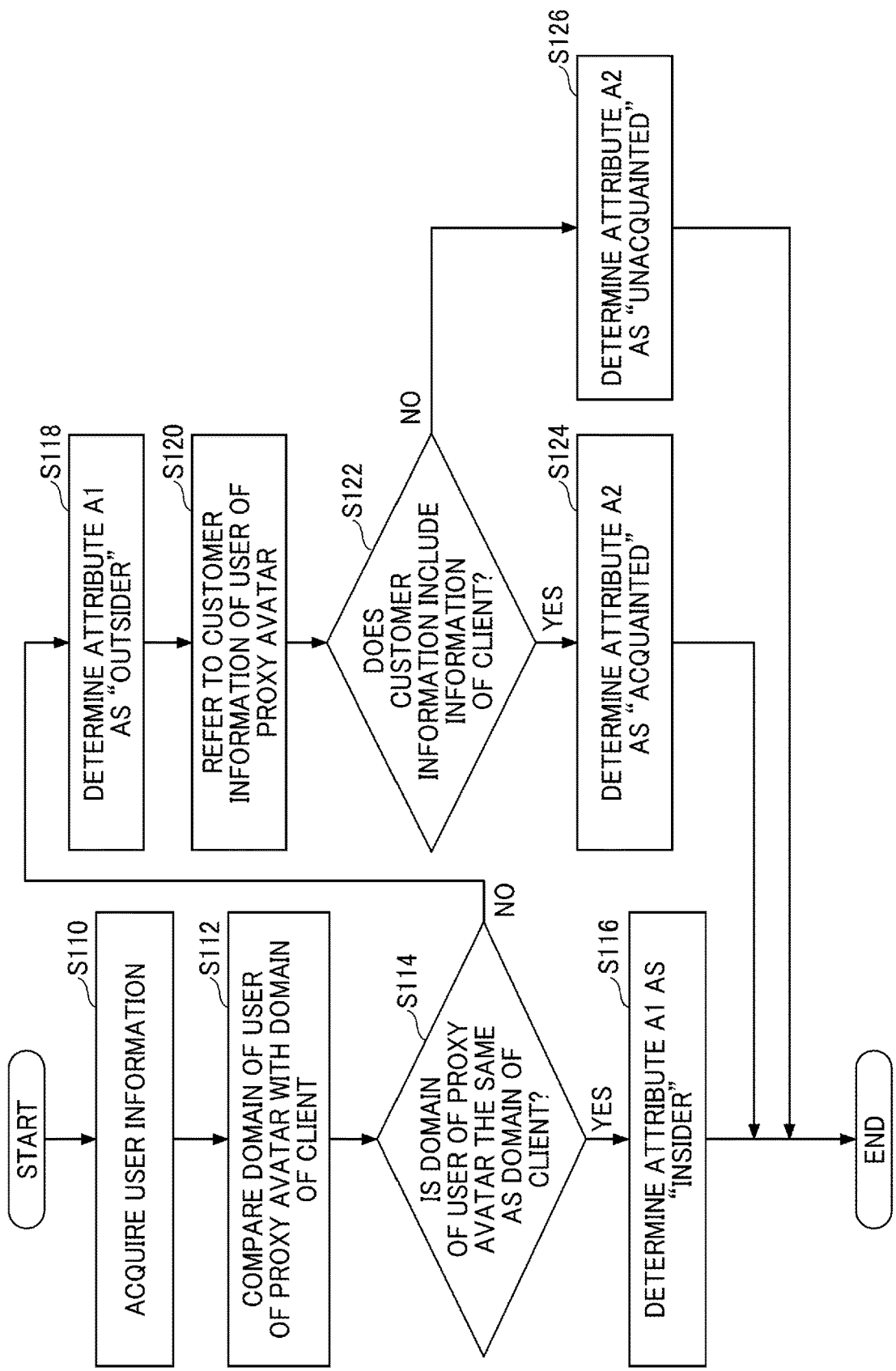

In the case of the scenario information in FIG. 18, for example, the proxy avatar controller 48 determines the attributes of the user B with the procedure illustrated in FIG. 23.

At step S110, the proxy avatar controller 48 reads the user information of the user A of the proxy avatar 1004 and the user information of the user B of the user avatar 1002 from the user information storage unit 60. The proxy avatar controller 48 may request the user avatar 1002 of the user B to provide the account of the user B. In response to receipt of the request for the account, the user avatar 1002 of the user B may provide the proxy avatar controller 48 with the account input by the user B, for example.

At step S112, the proxy avatar controller 48 identifies the domain of the user A based on the account included in the user information of the user A read at step S110. The proxy avatar controller 48 further identifies the domain of the user B based on the account included in the user information of the user B read at step S110. The proxy avatar controller 48 then compares the domain of the user A of the proxy avatar 1004 with the domain of the user B, who is the client.

At step S114, the proxy avatar controller 48 determines whether the domain of the user A of the proxy avatar 1004 is the same as the domain of the user B as the client. If it is determined that the domain of the user A is different from the domain of the user B (NO at step S114), the proxy avatar controller 48 proceeds to the process of step S118 to determine an attribute of the client, i.e., "ATTRIBUTE A1" in the scenario information of FIG. 18, as "OUTSIDER." If it is determined that the domain of the user A is the same as the domain of the user B (YES at step S114), the proxy avatar controller 48 proceeds to the process of step S116 to determine an attribute of the client, i.e., "ATTRIBUTE A1" in the scenario information of FIG. 18, as "INSIDER." After determining an attribute of the client, i.e., "ATTRIBUTE A1" in the scenario information of FIG. 18, as "OUTSIDER" at step S118, the proxy avatar controller 48 proceeds to the process of step S120.

At step S120, the proxy avatar controller 48 refers to customer information of the user A of the proxy avatar 1004. To refer to the customer information, the proxy avatar controller 48 refers to a customer information management location, the access to which is allowed by the user A of the proxy avatar 1004, for example. At step S122, the proxy avatar controller 48 determines whether the customer information of the user A of the proxy avatar 1004 referred to at step S120 includes information of the client.

If it is determined that the customer information of the user A of the proxy avatar 1004 referred to at step S120 includes information of the client (YES at step S122), the proxy avatar controller 48 proceeds to the process of step S124 to determine another attribute of the client, i.e., "ATTRIBUTE A2" in the scenario information of FIG. 18, as "ACQUAINTED."

If it is determined that the customer information of the user A of the proxy avatar 1004 referred to at step S120 does not include information of the client (NO at step S122), the proxy avatar controller 48 proceeds to the process of step S126 to determine another attribute of the client, i.e., "ATTRIBUTE A2" in the scenario information of FIG. 18, as "UNACQUAINTED."

Returning to step S36 in FIG. 19, the proxy avatar controller 48 identifies the scenario in accordance with the attributes of the client. In the case of the scenario information in FIG. 15, the proxy avatar controller 48 identifies different scenarios depending on whether the attribute of the client determined at step S34 is "INSIDER" or "OUTSIDER."

In the case of the scenario information in FIG. 16, the proxy avatar controller 48 identifies different scenarios depending on whether the attribute of the client determined at step S34 is "OUTSIDER," the combination of "INSIDER" and "SAME OR LOWER POSITION," or the combination of "INSIDER" and "HIGHER POSITION."

In the case of the scenario information in FIG. 17, the proxy avatar controller 48 identifies different scenarios depending on whether the attribute of the client determined at step S34 is "OUTSIDER," the combination of "INSIDER" and "SAME DEPARTMENT," or the combination of "INSIDER" and "DIFFERENT DEPARTMENT."

In the case of the scenario information in FIG. 18, the proxy avatar controller 48 identifies different scenarios depending on whether the attribute of the client determined at step S34 is "INSIDER," the combination of "OUTSIDER" and "UNACQUAINTED," or the combination of "OUTSIDER" and "ACQUAINTED."

At step S38, the proxy avatar controller 48 causes the proxy avatar 1004 to execute the following process based on the scenario identified at step S36.

Figure 24:
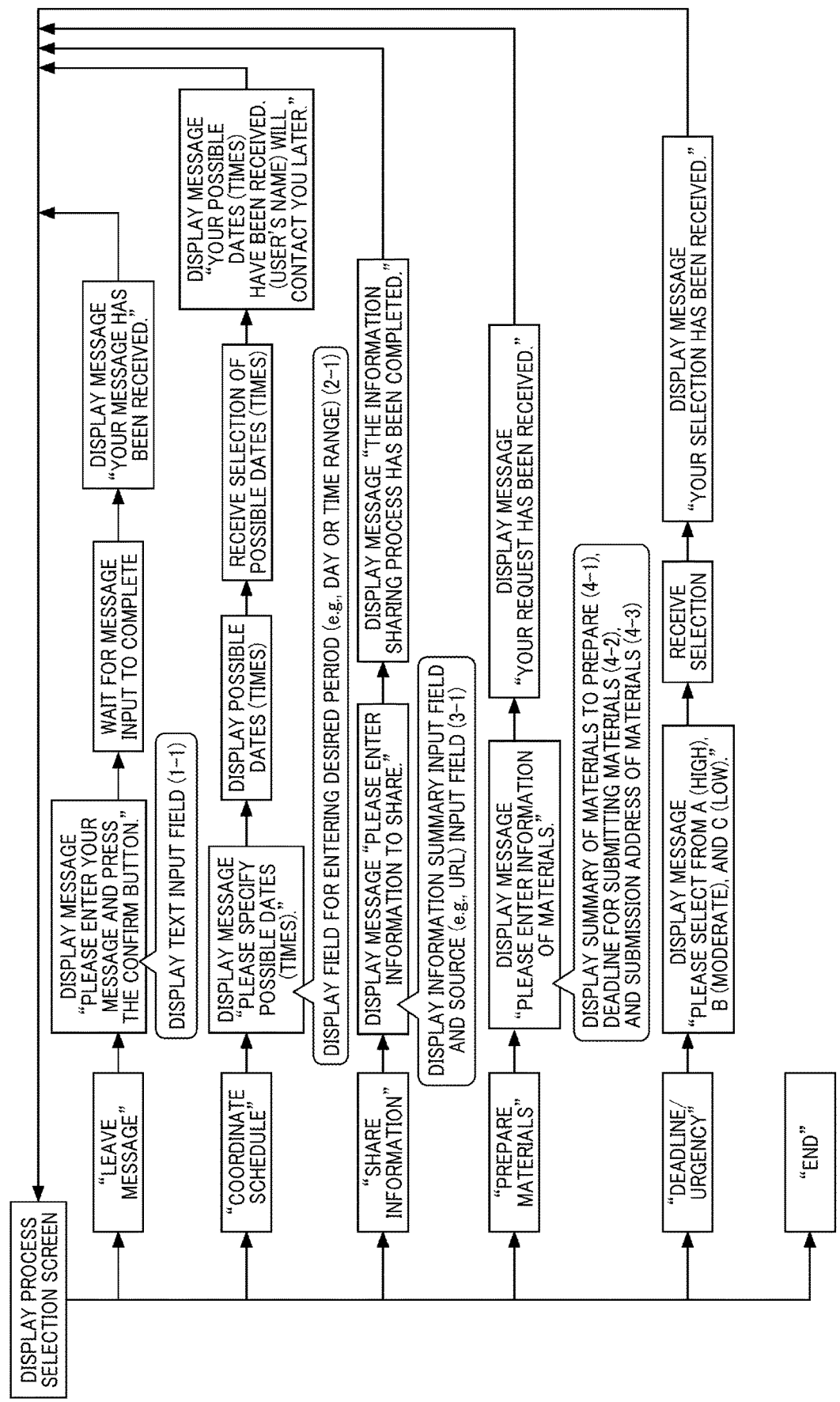
FIGS. 24 and 25 are diagrams illustrating exemplary processes of the proxy avatar of the first embodiment based on an identified scenario.

In the case of the scenario information in FIG. 15, for example, if the attribute of the client is "INSIDER" in the scenario identified at step S36, the proxy avatar controller 48 executes the process with the procedure illustrated in FIG. 24. FIG. 24 is a diagram illustrating an exemplary process of the proxy avatar 1004 based on the identified scenario. Based on the scenario identified at step S36, the proxy avatar controller 48 displays a process selection screen for receiving the request to leave a message, the request to coordinate schedule, the request to share information, the request to prepare materials, and a request concerning deadline or urgency, for example, to receive the selection of a process (i.e., request) by the client. In response to receipt of the process selected by the client from the processes displayed on the process selection screen, the proxy avatar controller 48 executes the received process, as illustrated in FIG. 24, for example.

Figure 25:
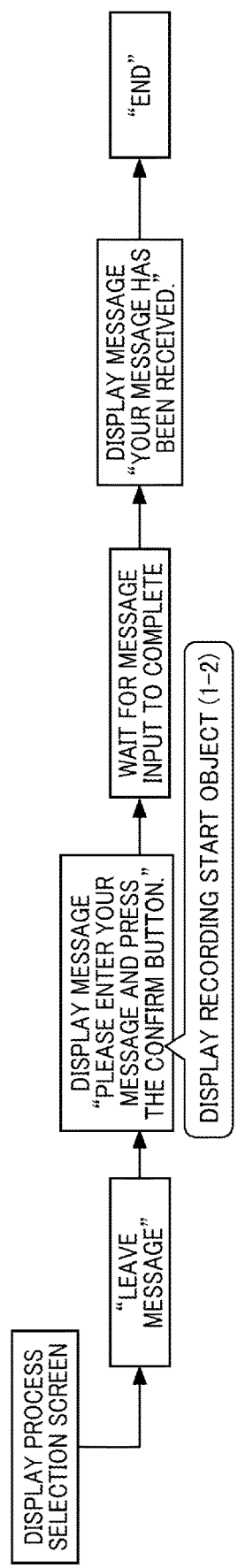

In the case of the scenario information in FIG. 15, for example, if the attribute of the client is "OUTSIDER" in the scenario identified at step S36, the proxy avatar controller 48 executes the process with the procedure illustrated in FIG. 25. FIG. 25 is a diagram illustrating an exemplary process of the proxy avatar 1004 based on the identified scenario. Based on the scenario identified at step S36, the proxy avatar controller 48 displays a process selection screen for receiving the request to leave a message, for example, to receive the selection of the process (i.e., request) by the client. In response to receipt of the process displayed on the process selection screen and selected by the client, the proxy avatar controller 48 executes the received process, as illustrated in FIG. 25, for example.

Figure 26:
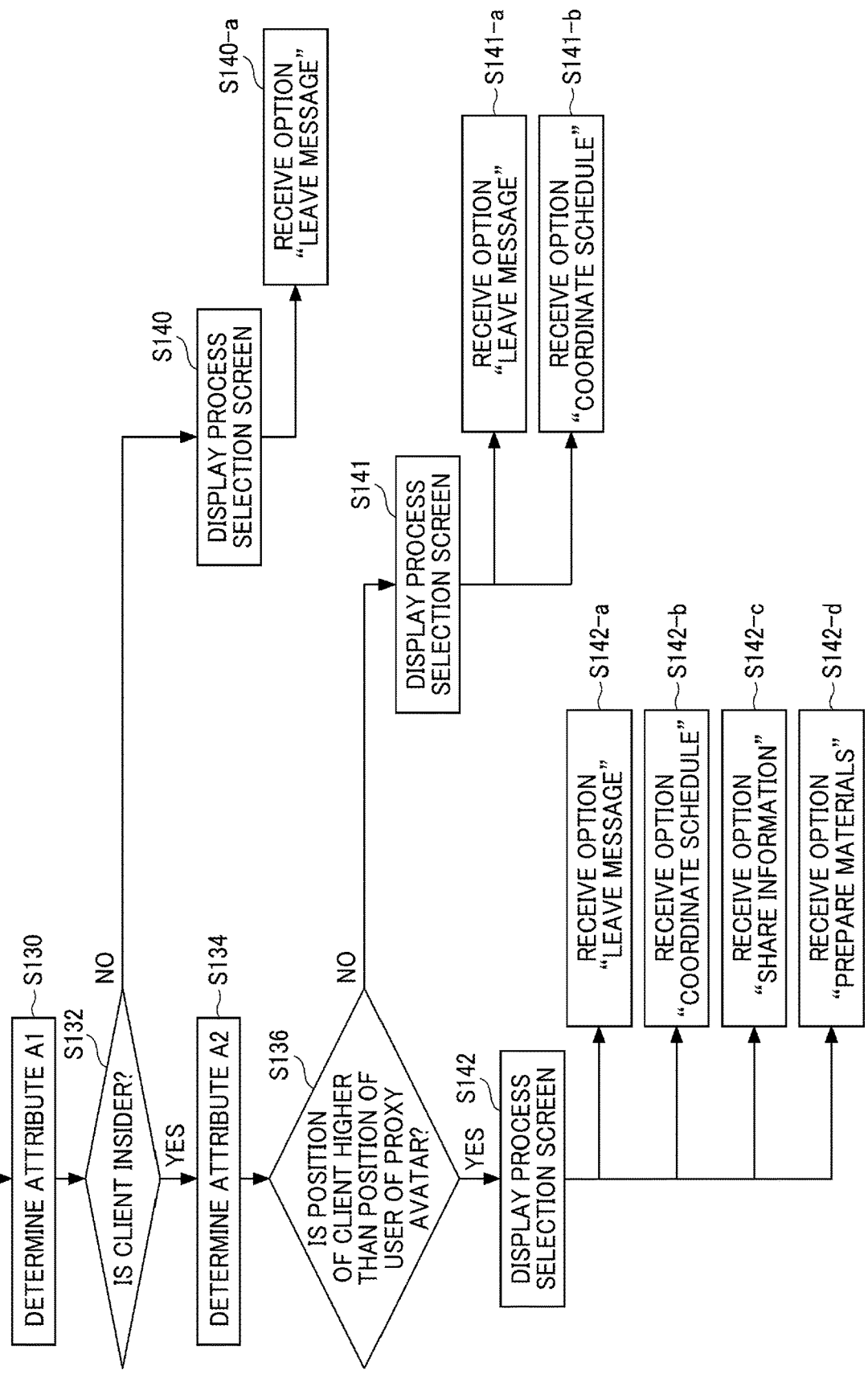
FIGS. 26, 27, and 28 are flowcharts illustrating exemplary processes of the proxy avatar of the first embodiment based on the identified scenario.

In the case of the scenario information in FIG. 16, for example, the proxy avatar controller 48 executes the process with the procedure illustrated in FIG. 26. FIG. 26 is a flowchart illustrating an exemplary process of the proxy avatar 1004 based on the identified scenario.

If the attribute of the client is "OUTSIDER" in the scenario identified at step S36 (NO at step S132), the proxy avatar controller 48 displays the process selection screen for receiving the request to leave a message based on the identified scenario (step S140 and S140-*a*), for example, to receive the selection of the process (i.e., request) by the client. In response to receipt of the process displayed on the process selection screen and selected by the client, the proxy avatar controller 48 executes the received process.

If the attribute of the client is the combination of "INSIDER" and "HIGHER POSITION" in the scenario identified at step S36 (YES at step S132 and YES at step S136), the proxy avatar controller 48 displays a process selection screen (step S142) for receiving the request to leave a message (S142-*a*), the request to coordinate schedule (S142-*b*), the request to share information (S142-*c*), and the request to prepare materials (S142-*d*) based on the identified scenario, for example, to receive the selection of a process (i.e., request) by the client. In response to receipt of the process selected by the client from the processes displayed on the process selection screen, the proxy avatar controller 48 executes the received process.

If the attribute of the client is the combination of "INSIDER" and "SAME OR LOWER POSITION" in the scenario identified at step S36 (YES at step S132 and NO at step S136), the proxy avatar controller 48 displays a process selection screen (step S141) for receiving the request to leave a message (step S141-*a*) and the request to coordinate schedule (S141-*b*) based on the identified scenario, for example, to receive the selection of a process (i.e., request) by the client. In response to receipt of the process selected by the client from the processes displayed on the process selection screen, the proxy avatar controller 48 executes the received process.

Figure 27:
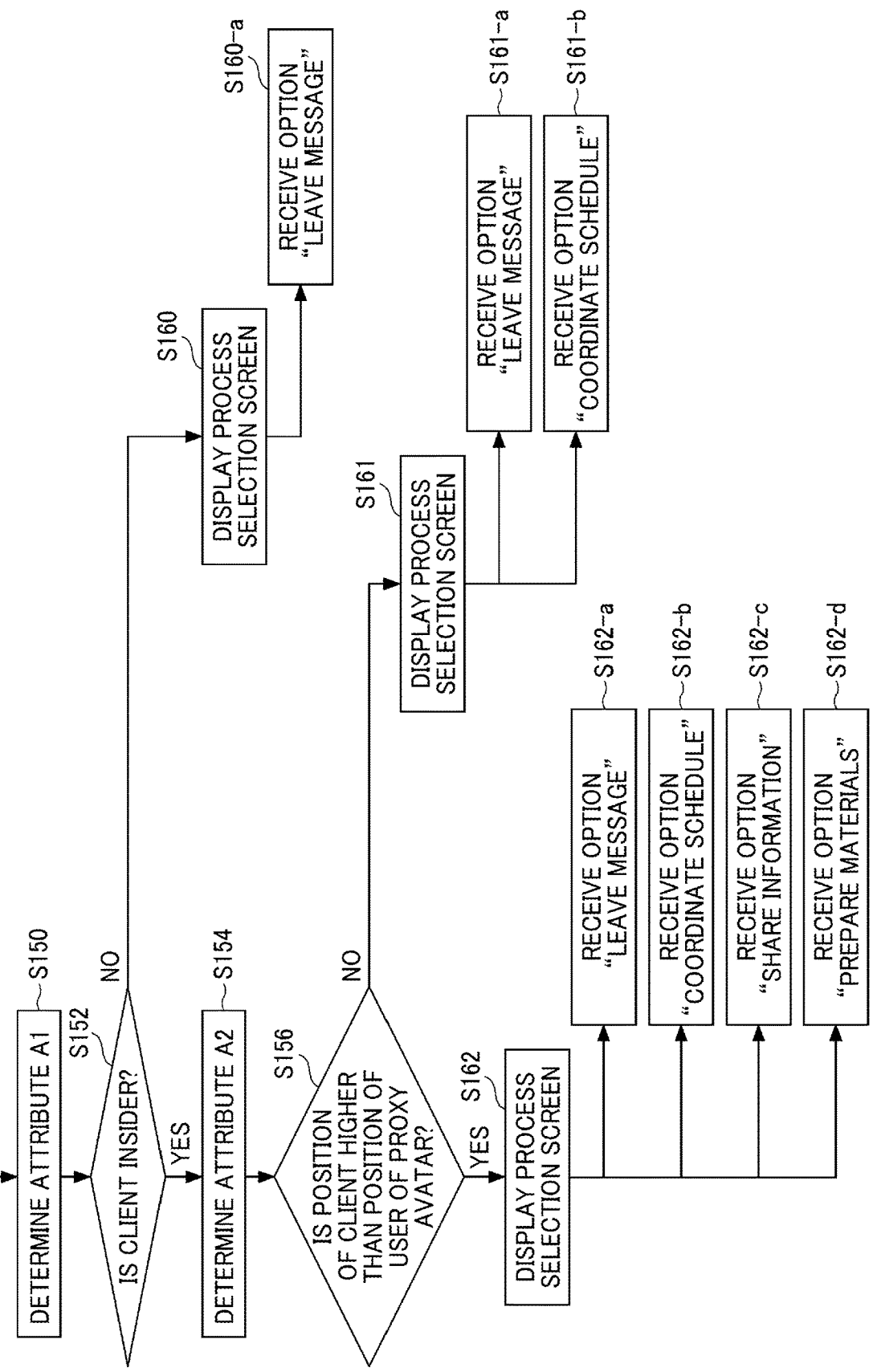

In the case of the scenario information in FIG. 17, for example, the proxy avatar controller 48 executes the process with the procedure illustrated in FIG. 27. FIG. 27 is a flowchart illustrating an exemplary process of the proxy avatar 1004 based on the identified scenario.

If the attribute of the client is "OUTSIDER" in the scenario identified at step S36 (NO at step S152), the proxy avatar controller 48 displays the process selection screen for receiving the request to leave a message based on the identified scenario (step S160, S160-*a*), for example, to receive the selection of the process (i.e., request) by the client. In response to receipt of the process displayed on the process selection screen and selected by the client, the proxy avatar controller 48 executes the received process.

If the attribute of the client is the combination of "INSIDER" and "SAME DEPARTMENT" in the scenario identified at step S36 (YES at step S152 and YES at step S156), the proxy avatar controller 48 displays the process selection screen (step S162) for receiving the request to leave a message (S162-*a*), the request to coordinate schedule (S162-*b*), the request to share information (S162-*c*), and the request to prepare materials (S162-*d*) based on the identified scenario, for example, to receive the selection of a process (i.e., request) by the client. In response to receipt of the process selected by the client from the processes displayed on the process selection screen, the proxy avatar controller 48 executes the received process.

If the attribute of the client is the combination of "INSIDER" and "DIFFERENT DEPARTMENT" in the scenario identified at step S36 (YES at step S152 and NO at step S156), the proxy avatar controller 48 displays the process selection screen for receiving the request to leave a message (S161-*a*) and the request to coordinate schedule (S161-*b*) identified scenario (step S161), for example, to receive the selection of a process (i.e., request) by the client. In response to receipt of the process selected by the client from the processes displayed on the process selection screen, the proxy avatar controller 48 executes the received process.

Figure 28:
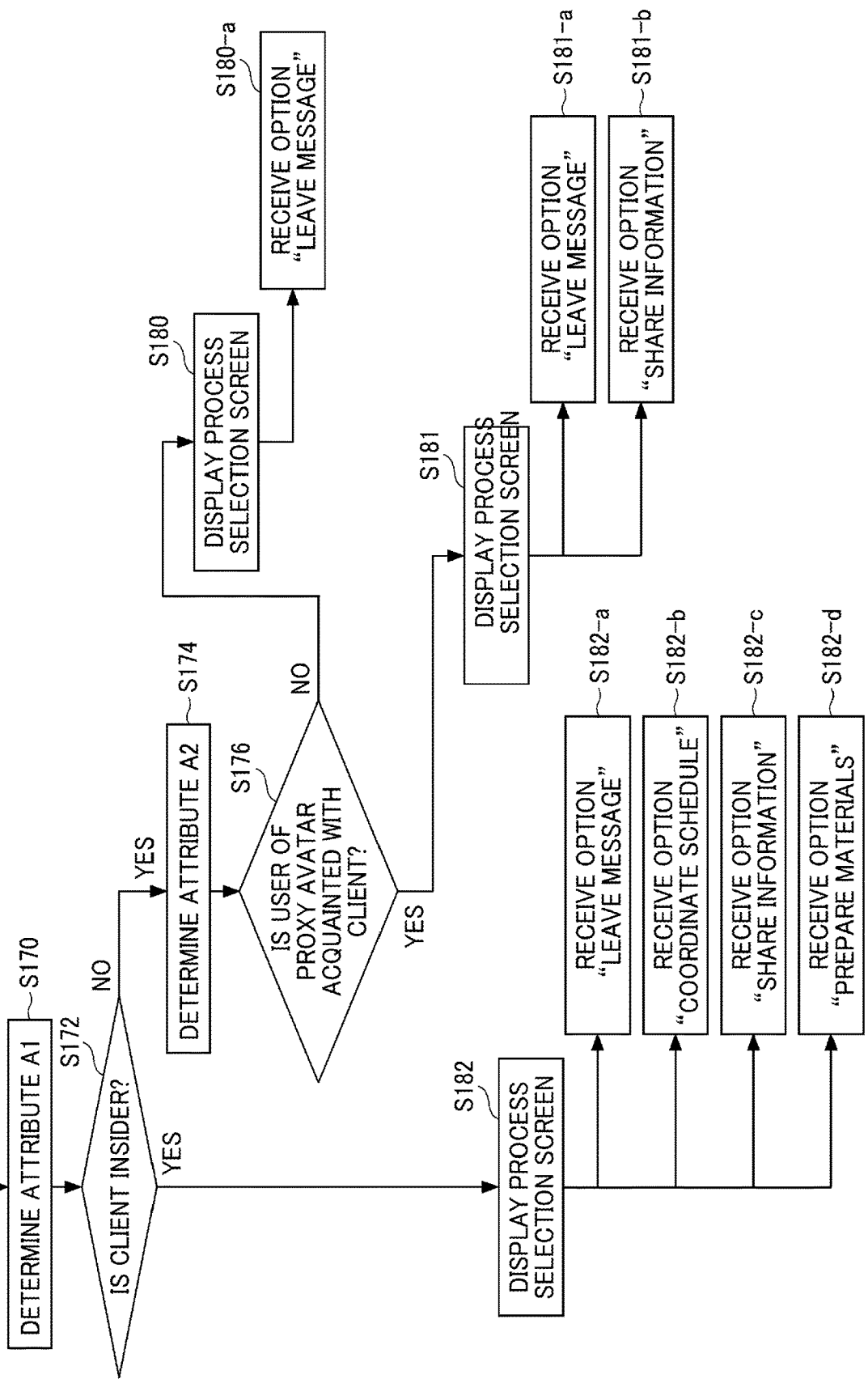

In the case of the scenario information in FIG. 18, for example, the proxy avatar controller 48 executes the process with the procedure illustrated in FIG. 28. FIG. 28 is a flowchart illustrating an exemplary process of the proxy avatar 1004 based on the identified scenario.

If the attribute of the client is "INSIDER" in the scenario identified at step S36 (YES at step S172), the proxy avatar controller 48 displays the process selection screen (step S182) for receiving the request to leave a message (S182-*a*), the request to coordinate schedule (S182-*b*), the request to share information (S182-*c*), and the request to prepare materials (S182-*d*) based on the identified scenario (step S182), for example, to receive the selection of a process (i.e., request) by the client. In response to receipt of the process selected by the client from the processes displayed on the process selection screen, the proxy avatar controller 48 executes the received process.

If the attribute of the client is the combination of "OUTSIDER" and "ACQUAINTED" in the scenario identified at step S36 (NO at step S172 and YES at step S176), the proxy avatar controller 48 displays the process selection screen (step S181) for receiving the request to leave a message (S181-*a*) and the request to share information (S181-*b*) based on the identified scenario, for example, to receive the selection of a process (i.e., request) by the client. In response to receipt of the process selected by the client from the processes displayed on the process selection screen, the proxy avatar controller 48 executes the received process.

If the attribute of the client is the combination of "OUTSIDER" and "UNACQUAINTED" in the scenario identified at step S36 (NO at step S172 and NO at step S176), the proxy avatar controller 48 displays the process selection screen for receiving the request to leave a message based on the identified scenario (step S180, S180-*a*), for example, to receive the selection of the process (i.e., request) by the client. In response to receipt of the process displayed on the process selection screen and selected by the client, the proxy avatar controller 48 executes the received process.

Returning to step S40 in FIG. 19, the proxy avatar controller 48 determines whether the request of the client to the proxy avatar 1004 has been completed. The proxy avatar controller 48 repeats the process of step S38 until the completion of the request of the client to the proxy avatar 1004 is determined.

If the completion of the request of the client to the proxy avatar 1004 is determined (YES at step S40), the proxy avatar controller 48 returns to the process of step S32. If the contact of the user avatar 1002 of the user B with the proxy avatar 1004 of the user A (or the approach of the user avatar 1002 to the particular range from the proxy avatar 1004) is not determined (NO at step S32), the proxy avatar controller 48 performs the process of step S42.

At step S42, the proxy avatar controller 48 determines whether the proxy avatar 1004 has left the virtual space 1000. If it is determined that the proxy avatar 1004 has not left the virtual space 1000 (NO at step S42), the proxy avatar controller 48 returns to the process of step S32. If it is determined that the proxy avatar 1004 has left the virtual space 1000 (YES at step S42), the proxy avatar controller 48 completes the process of FIG. 19.

Figure 29:
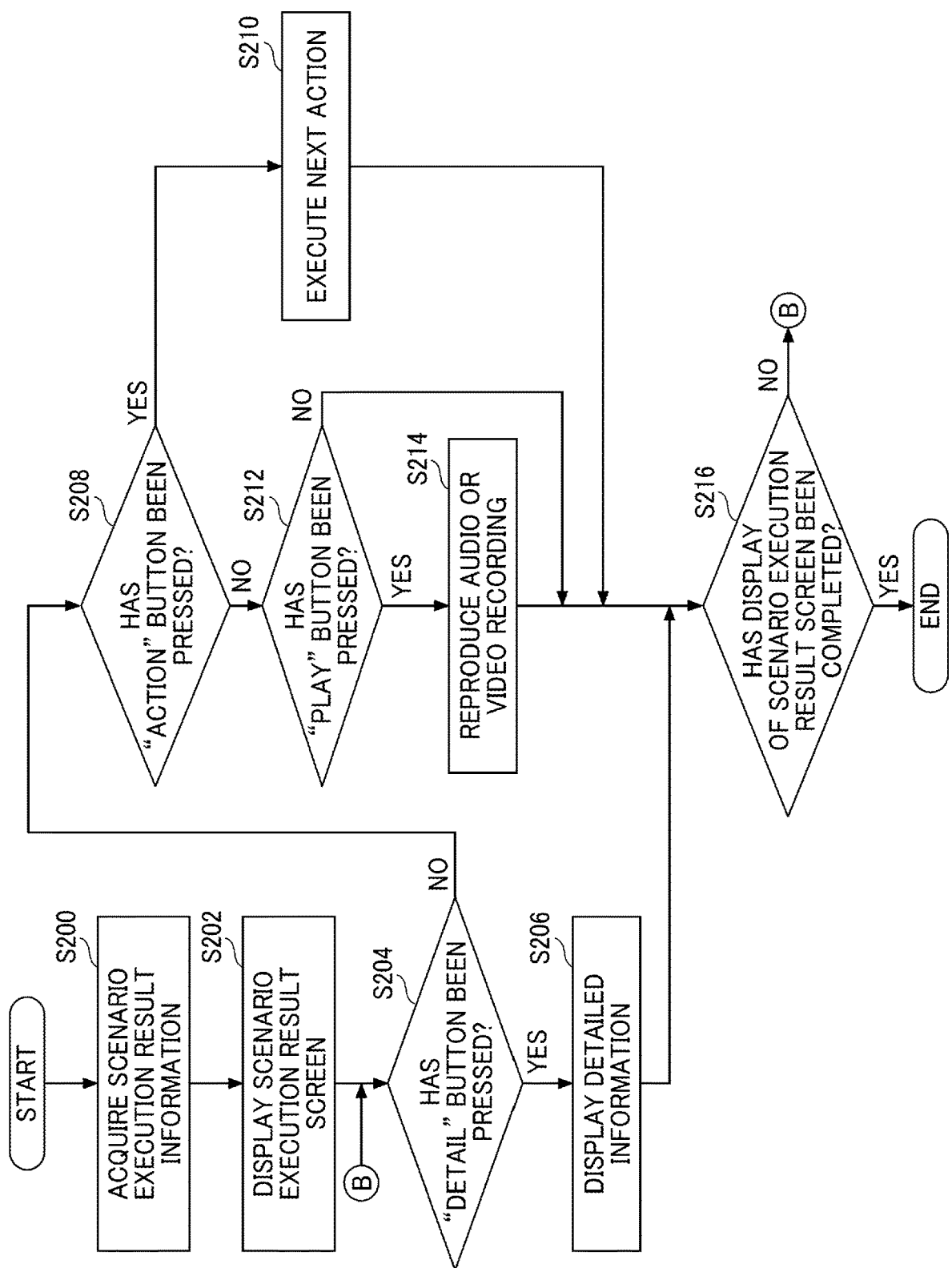
FIG. 29 is a flowchart illustrating an exemplary process of the first embodiment performed when a user avatar of the user returns to the virtual space.

When the user avatar of the user A returns to the virtual space 1000 after the absence therefrom, the proxy avatar controller 48 performs the process illustrated in FIG. 29, for example. FIG. 29 is a flowchart illustrating an exemplary process performed when the user avatar of the user A returns to the virtual space 1000.

At step S200, the proxy avatar controller 48 acquires scenario execution result information from the scenario execution result information storage unit 68. The scenario execution result information acquired at step S200 is the information of the process executed by the proxy avatar 1004 of the user A in accordance with the scenario during the absence of the user avatar of the user A from the virtual space 1000.

At space S202, the proxy avatar controller 48 causes the user terminal 12A to display a scenario execution result screen 2000 illustrated in FIG. 30, for example, in accordance with the scenario execution result information acquired at step S200. The information processing apparatus 10 transmits screen data for displaying the scenario execution result screen 2000 to the user terminal 12A.

FIG. 30 is a diagram illustrating an example of the scenario execution result screen 2000. In the scenario execution result screen 2000, the information of each process executed by the proxy avatar 1004 of the user A in accordance with the scenario is displayed in an agent task table, for example. In the agent task table, the request of the client received by the proxy avatar 1004 of the user A is displayed as a task. The agent task table includes information items "TIME OF RECEIPT," "CLIENT," "ITEM," "STATUS," "DEGREE OF URGENCY," and "NEXT ACTION" for each request (i.e., task) received from the client.

The item "TIME OF RECEIPT" represents the time when the proxy avatar 1004 of the user A receives the request from the client. The item "CLIENT" is an example of information for identifying the user who makes the request to the proxy avatar 1004 of the user A. The item "ITEM" represents the item of request from the client (e.g., "MESSAGE," "SCHEDULE," "SHARING INFORMATION," or "PREPARING MATERIALS").

The item "STATUS" is information representing the status of the request from the client (e.g., "RESPONDED," "NOT RESPONDED," or "INSTRUCTION RECEIVED"). The item "DEGREE OF URGENCY" is information representing the degree of importance of the request from the client. The item "NEXT ACTION" is information representing a desirable action to be taken by the user A to respond to the request from the client.

In the scenario execution result screen 2000 of FIG. 30, the tasks in the agent task table are sorted by the time of receipt. The scenario execution result screen 2000 may include a "SORT BY PRIORITY" button to sort the tasks by priority, a "SORT BY URGENCY" button to sort the tasks by urgency, and a "SORT BY CLIENT" button to sort the tasks by client, for example. Further, in the scenario execution result screen 2000, the agent task table may be displayed with a tab for switching the agent task table to display (e.g., a tab for displaying the agent task table sorted by client).

The scenario execution result screen 2000 further displays a "DETAIL" button 2002, an "ACTION" button 2004, and a "PLAY" button 2006 for each of the tasks in the agent task table. The "DETAIL" button 2002 is for receiving from the user A an operation of displaying detailed information of the task. The "ACTION" button 2004 is for receiving from the user A an operation of executing the action displayed in the item "NEXT ACTION," such as an operation of starting an application corresponding to the action. The "PLAY" button 2006 is for receiving from the user A an operation of reproducing the audio or video recording of the situation of receipt of the request from the client. In the example of the scenario execution result screen 2000 in FIG. 30, the "PLAY" button 2006 is provided for each of the tasks. Alternatively, the scenario execution result screen 2000 may include a single "PLAY" button for continuously reproducing the audio or video recordings corresponding to multiple tasks in the agent task table.

According to the scenario execution result screen 2000 of FIG. 30, when the user A returns to the virtual space 1000 with the user avatar thereof after the absence from the virtual space 1000 with the proxy avatar 1004 participating therein, the efficiency for the user A to respond to the tasks received from the clients by the proxy avatar 1004 is improved.

The scenario execution result screen 2000 of FIG. 30 is illustrative. The agent task table may be provided to the user A through an electronic mail transmitted to an electronic mail address of the user A or through a pop-up window displayed in the virtual space 1000.

Returning to step S204 in FIG. 29, the proxy avatar controller 48 determines whether the "DETAIL" button 2002 in the scenario execution result screen 2000 has been pressed. If it is determined that the "DETAIL" button 2002 has been pressed (YES at step S204), the proxy avatar controller 48 proceeds to the process of step S206. At step S206, the proxy avatar controller 48 displays the detailed information of the task corresponding to the pressed "DETAIL" button 2002, and proceeds to the process of step S216.

If it is determined that the "DETAIL" button 2002 has not been pressed (NO at step S204), the proxy avatar controller 48 determines at step S208 whether the "ACTION" button 2004 in the scenario execution result screen 2000 has been pressed. If it is determined that the "ACTION" button 2004 has been pressed (YES at step S208), the proxy avatar controller 48 proceeds to the process of step S210. At step S210, the proxy avatar controller 48 executes the action displayed in the item "NEXT ACTION" of the task corresponding to the pressed "ACTION" button 2004, and proceeds to the process of step S216.

If it is determined that the "ACTION" button 2004 has not been pressed (NO at step S208), the proxy avatar controller 48 determines at step S212 whether the "PLAY" button 2006 in the scenario execution result screen 2000 has been pressed. If it is determined that the "PLAY" button 2006 has been pressed (YES at step S212), the proxy avatar controller 48 proceeds to the process of step S214. At step S214, the proxy avatar controller 48 reproduces the audio or video recording of the situation of receipt from the client of the task corresponding to the pressed "PLAY" button 2006, and proceeds to the process of step S216.

At step S216, the proxy avatar controller 48 determines whether the display of the scenario execution result screen 2000 has been completed. If it is determined that the display of the scenario execution result screen 2000 has not been completed (NO at step S216), the proxy avatar controller 48 returns to the process of step S204. If it is determined that the display of the scenario execution result screen 2000 has been completed (YES at step S216), the proxy avatar controller 48 completes the process of FIG. 29.

According to the first embodiment, the response of the proxy avatar 1004 changes in accordance with the relationship between the user A, who causes the proxy avatar 1004 to participate in the virtual space 1000, and the user B, who makes a request to the proxy avatar 1004 of the user A. The virtual space 1000 of the present embodiment therefore enables diverse communication.

A second embodiment of the present invention will be described.

In the first embodiment, the user B, i.e., a third party other than the user A, makes a request to the proxy avatar 1004 of the user A. In the second embodiment, on the other hand, the user A makes a request to the proxy avatar 1004 thereof.

For example, when leaving the virtual space 1000, the user A may request the proxy avatar 1004 thereof to perform a process such as collecting information. The user A may also request the proxy avatar 1004 to perform a process such as collecting information when the user avatar of the user A is participating in the virtual space 1000. When the user avatar and the proxy avatar 1004 of the user A are both participating in the virtual space 1000, the user avatar controller 44 is not necessarily required to cause the user terminal 12 operated by a user other than the user A to display the user avatar of the user A in the virtual space 1000 as well as the proxy avatar 1004 of the user A. For example, when the user A is participating in the virtual space 1000 with the user avatar thereof and wants to concentrate on certain work, the user avatar controller 44 may hide the user avatar of the user A and display the proxy avatar 1004 of the user A in the virtual space 1000 displayed by the user terminal 12 operated by a user other than the user A.

Figure 31:
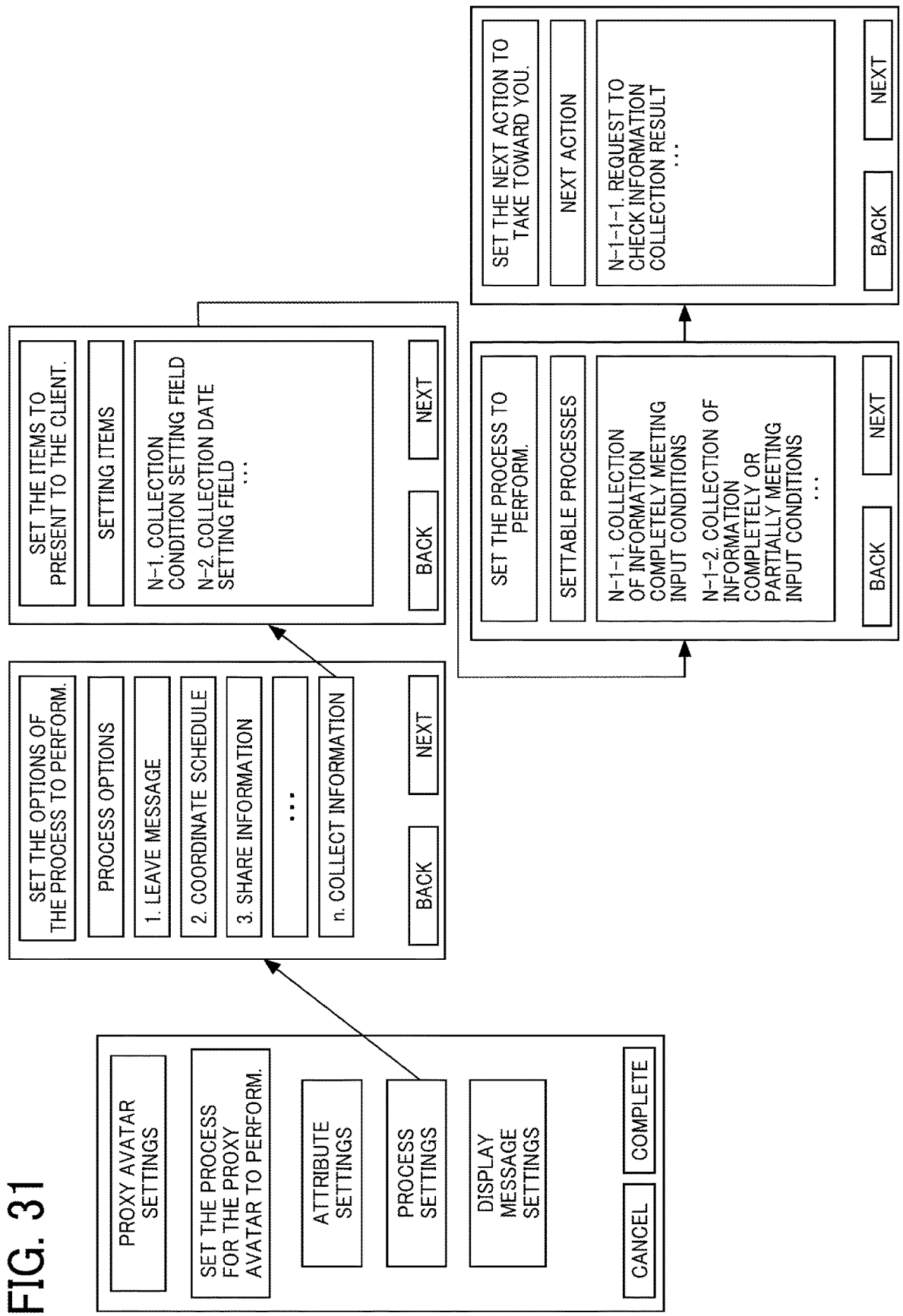
FIG. 31 is a diagram illustrating an example of the setting of the process to be performed by the proxy avatar in a second embodiment of the present invention.

In the second embodiment, the user A sets the process to be performed by the proxy avatar 1004, as illustrated in FIG. 31, for example. The setting of the process to be performed by the proxy avatar 1004 is executed under the control of the scenario setting manager 54.

FIG. 31 is a diagram illustrating an example of the setting of the process to be performed by the proxy avatar 1004. In the example of FIG. 31, when the "PROCESS SETTINGS" button is selected in the proxy avatar setting screen, the options of the process to be performed by the proxy avatar 1004 are interactively displayed.

For instance, in the example of FIG. 31, the options of the process to be performed by the proxy avatar 1004 such as "COLLECT INFORMATION" are displayed to prompt the user A to make selections related to the setting items, the settable processes, and the next action corresponding to the option "COLLECT INFORMATION," to thereby prompt the user A to set the process to be performed by the proxy avatar 1004.

Figure 32:
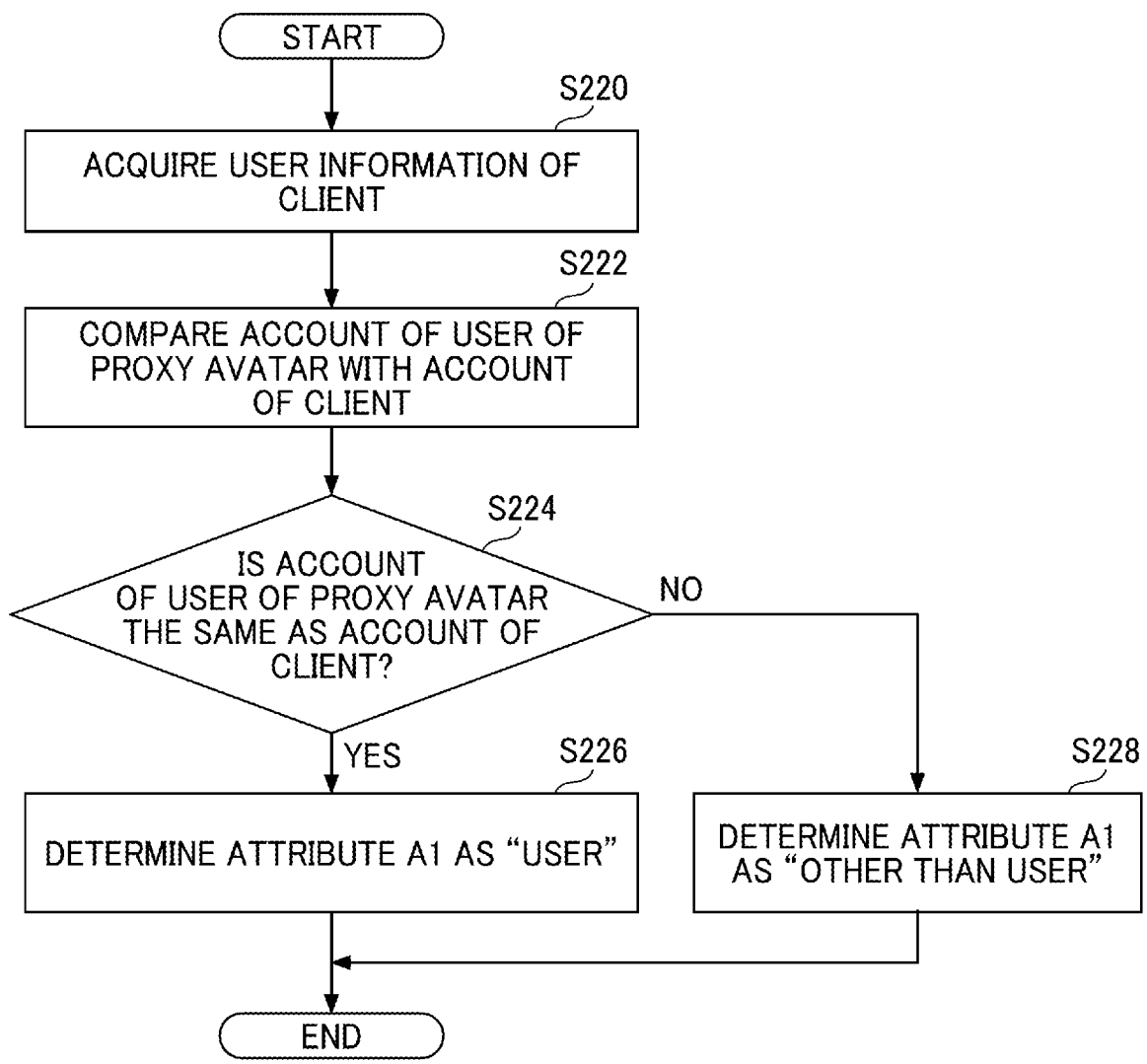
FIG. 32 is a flowchart illustrating an example of the attribute determination process of the second embodiment.

For example, in the second embodiment, the proxy avatar controller 48 determines an attribute of whether the client is the user A or other than the user A with the procedure illustrated in FIG. 32.

At step S220, the proxy avatar controller 48 reads, from the user information storage unit 60, the user information of the user A of the proxy avatar 1004 and the user information of the client who makes the request to the proxy avatar 1004.

At step S222, the proxy avatar controller 48 compares the account included in the user information of the user A read at step S220 with the account included in the user information of the client who makes the request to the proxy avatar 1004, which is also read at step S220.

At step S224, the proxy avatar controller 48 determines whether the account of the user A of the proxy avatar 1004 is the same as the account of the client who makes the request to the proxy avatar 1004. If it is determined that the account of the user A is the same as the account of the client (YES at step S224), the proxy avatar controller 48 proceeds to the process of step S226 to determine the attribute of the client as "USER." If it is determined that the account of the user A is different from the account of the client (NO at step S224), the proxy avatar controller 48 proceeds to the process of step S228 to determine the attribute of the client as "OTHER THAN USER."

As described above, according to the second embodiment, the user A causing the proxy avatar 1004 thereof to participate in the virtual space 1000 makes a request to the proxy avatar 1004. The virtual space 1000 of the present embodiment therefore enables diverse communication.

The apparatuses described in each of the embodiments disclosed in the present specification form one of a plurality of computing environments for implementing the embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising circuitry configured to invoke and cause a second avatar to participate in a virtual space based on an instruction from a first user, the second avatar representing the first user and being proxy for a first avatar that represents the first user and participates in the virtual space, the second avatar being different from the first avatar, determine whether the second avatar has been contacted by other avatar representing a second user, determine attributes of the second user upon determining that the second avatar has been contacted by the other avatar, identify a scenario in accordance with the attributes of the second user, and execute a process based on the scenario, wherein the circuitry transmits screen data to a user terminal operated by the first user, the screen data being used to display a screen in which content of information that is generated by executing the process based on the scenario is associated with content of an action expected to be taken by the first user.

2. The information processing apparatus of claim 1, wherein the circuitry records a situation of receipt of the information to the proxy avatar from the second user, and receives, via the screen, an operation of reproducing the recording.

3. The information processing apparatus of claim 1, wherein the circuitry receives, via a screen, setting of the information of the process to be performed by the proxy avatar, the screen interactively prompting the first user to select items of the process to be performed by the proxy avatar in accordance with the attribute information of the second user in processing order of the proxy avatar.

4. The information processing apparatus of claim 1, wherein the information of the process to be performed by the proxy avatar includes a message to display in accordance with the attribute information of the second user, and wherein the circuitry receives, via a screen, settings of the message to display in accordance with the attribute information of the second user, the screen prompting the first user to select between inputting desired text and selecting sample text.

5. The information processing apparatus of claim 1, wherein the attribute information of the second user includes information of an organization to which the second user belongs, information of a position of the second user in the organization, or information of a department of the organization to which the second user belongs.

6. The information processing apparatus of claim 5, wherein when domain information of the first user is the same as domain information of the second user, the circuitry identifies the attribute information of the second user based on the information of the position of the second user in the organization or the information of the department of the organization to which the second user belongs.

7. The information processing apparatus of claim 5, wherein when domain information of the first user is different from domain information of the second user, the circuitry identifies the attribute information of the second user based on customer information of the first user.

8. The information processing apparatus of claim 1, wherein the circuitry causes the proxy avatar to participate in the virtual space in accordance with an operation performed by the first user to cause the proxy avatar to participate in the virtual space, an operation performed by the first user to cause the user avatar to leave the virtual space, or a set time for the proxy avatar to participate in the virtual space.

9. The information processing apparatus of claim 1, wherein the circuitry generates a user interface including the screen, the screen having:

a first icon for receiving from the first user an operation of displaying detailed information of the action expected to be taken by the first user;

a second icon for receiving from the first user an operation of executing the action expected to be taken by the first user; and a third icon for receiving from the first user an operation of reproducing audio or video recording of situation of receipt of the information from the other avatar.

10. An information processing apparatus comprising circuitry configured to invoke and cause a second avatar to participate in a virtual space based on an instruction from a first user, the second avatar representing the first user and being proxy for a first avatar that represents the first user and participates in the virtual space, the second avatar being different from the first avatar, determine whether the second avatar has been contacted by other avatar representing a second user, determine attributes of the second user upon determining that the second avatar has been contacted by the other avatar, identify a scenario in accordance with the attribututes of the second user, and execute a process based on the scenario, wherein the circuitry transmits screen data to a user terminal operated by the first user, the screen data being used to display a screen in which content of information that is generated by executing the process based on the scenario is associated with content of an action expected to be taken by the first user.

11. The information processing apparatus of claim 10, wherein the virtual space is displayed on a first user terminal operated by the user of the proxy avatar and on a second user terminal operated by another user, and wherein when the user avatar and the proxy avatar of the user are participating in the virtual space, the circuitry displays the user avatar of the user in the virtual space displayed on the first user terminal and hides the user avatar of the user in the virtual space displayed on the second user terminal.

12. An information processing system comprising:

the information processing apparatus of claim 1; and a user terminal communicably connected to the information processing apparatus and operated by the first user, the user terminal including another circuitry configured to cause a display to display the virtual space for the user avatar and the proxy avatar to participate in, and receive an operation performed on the user avatar or the proxy avatar by the first user.

13. An information processing method comprising:

invoking and causing a second avatar to participate in a virtual space based on an instruction from a first user, the second avatar representing the first user and being proxy for a first avatar that represents the first user and participates in the virtual space, the second avatar being different from the first avatar, determining whether the second avatar has been contacted by other avatar representing a second user, determining attributes of the second user upon determining that the second avatar has been contacted by the other avatar, identifying a scenario in accordance with the attributes of the second user, wherein the method further comprises transmitting screen data to a user terminal operated by the first user, the screen data being used to display a screen in which content of information that is generated by executing the process based on the scenario is associated with content of an action expected to be taken by the first user.

* * * * *